(12) United States Patent
Maeda

(10) Patent No.: US 9,141,856 B2
(45) Date of Patent: Sep. 22, 2015

(54) CLOTHING IMAGE ANALYSIS APPARATUS, METHOD, AND INTEGRATED CIRCUIT FOR IMAGE EVENT EVALUATION

(75) Inventor: Kazuhiko Maeda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 323 days.

(21) Appl. No.: 13/814,813

(22) PCT Filed: Jul. 5, 2012

(86) PCT No.: PCT/JP2012/004368
§ 371 (c)(1),
(2), (4) Date: Feb. 7, 2013

(87) PCT Pub. No.: WO2013/008427
PCT Pub. Date: Jan. 17, 2013

(65) Prior Publication Data
US 2013/0136313 A1    May 30, 2013

(30) Foreign Application Priority Data

Jul. 13, 2011 (JP) .................................. 2011-155063

(51) Int. Cl.
*G06K 9/00* (2006.01)
*G06F 17/30* (2006.01)

(52) U.S. Cl.
CPC ...... *G06K 9/00577* (2013.01); *G06F 17/30247* (2013.01); *G06K 9/00288* (2013.01); *G06K 9/00362* (2013.01)

(58) Field of Classification Search
CPC .......... G06K 9/00362; G06K 9/00577; G06K 9/00288; G06F 17/30247; G06F 17/30265; G06F 17/3025; G06F 17/30256; G06F 17/30259; G06F 17/30262; G06F 17/3028
See application file for complete search history.

(56) References Cited

U.S. PATENT DOCUMENTS

| 2003/0174869 | A1* | 9/2003 | Suarez ......................... 382/118 |
| 2006/0253491 | A1* | 11/2006 | Gokturk et al. ............ 707/104.1 |
| 2009/0091798 | A1 | 4/2009 | Lawther et al. |
| 2012/0281887 | A1 | 11/2012 | Yamaguchi |

FOREIGN PATENT DOCUMENTS

| JP | 2009-301119 | 12/2009 |
| JP | 2011-517791 | 6/2011 |
| WO | 2011/089884 | 7/2011 |

OTHER PUBLICATIONS

Luo et al., "Person-specific SIFT Features for Face Recognition", Apr. 20, 2007, IEEE Int. Conf. on Acoustics, Speech and Signal Processing 2007, vol. 2, p. 593-596.*
International Search Report issued Oct. 2, 2012 in International (PCT) Application No. PCT/JP2012/004368.

* cited by examiner

*Primary Examiner* — Bhavesh Mehta
*Assistant Examiner* — Timothy Choi
(74) *Attorney, Agent, or Firm* — Wenderoth, Lind & Ponack, L.L.P.

(57) ABSTRACT

In an image evaluation apparatus, a clothing recognition unit performs, for each person appearing in each of images included in an image group generated by an image group generation unit, recognition of clothing that the person is wearing. An image event evaluation unit, according to types of clothing recognized by the clothing recognition unit and a frequency of appearance of each type of clothing in the images in the image group, collectively evaluates the images included in the image group.

15 Claims, 22 Drawing Sheets

FIG.2

| Image ID | Photography date/time | Image group ID | Face ID |
|---|---|---|---|
| 1 | 10:00, October 10, 2010 | 1 | 1, 2, 3, 4 |
| 2 | 10:02, October 10, 2010 | 1 | 5, 6 |
| ... | ... | ... | ... |
| 100 | 15:32, October 10, 2010 | 1 | 125 |
| 101 | 13:21, November 1, 2010 | 2 | 126, 127 |
| ... | ... | ... | ... |

| Face ID | Image characteristics of clothing | | | | First clothing type |
|---|---|---|---|---|---|
| | Image characteristics 1 | Image characteristics 2 | ... | Image characteristics n | |
| 1 | 0.3 | 0.2 | ... | 0.5 | Unspecified |
| 2 | 0.21 | 0.18 | ... | 0.44 | School gym uniform |
| 3 | 0.14 | 0.5 | ... | 0.2 | School gym uniform |
| 4 | 0.27 | 0.2 | ... | 0.3 | Unspecified |
| 5 | 0.22 | 0.33 | ... | 0.41 | School gym uniform |
| 6 | 0.11 | 0.25 | ... | 0.54 | ... |
| ... | ... | ... | ... | ... | |

301

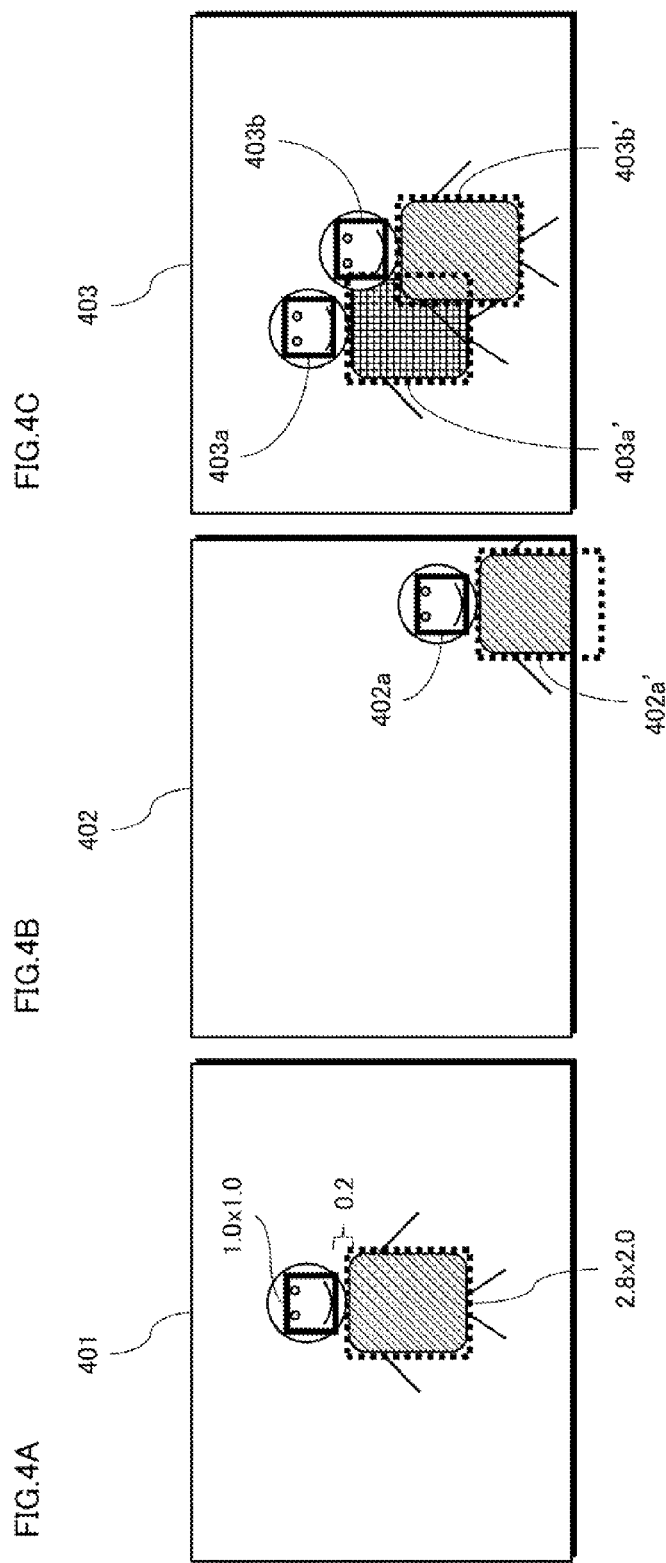

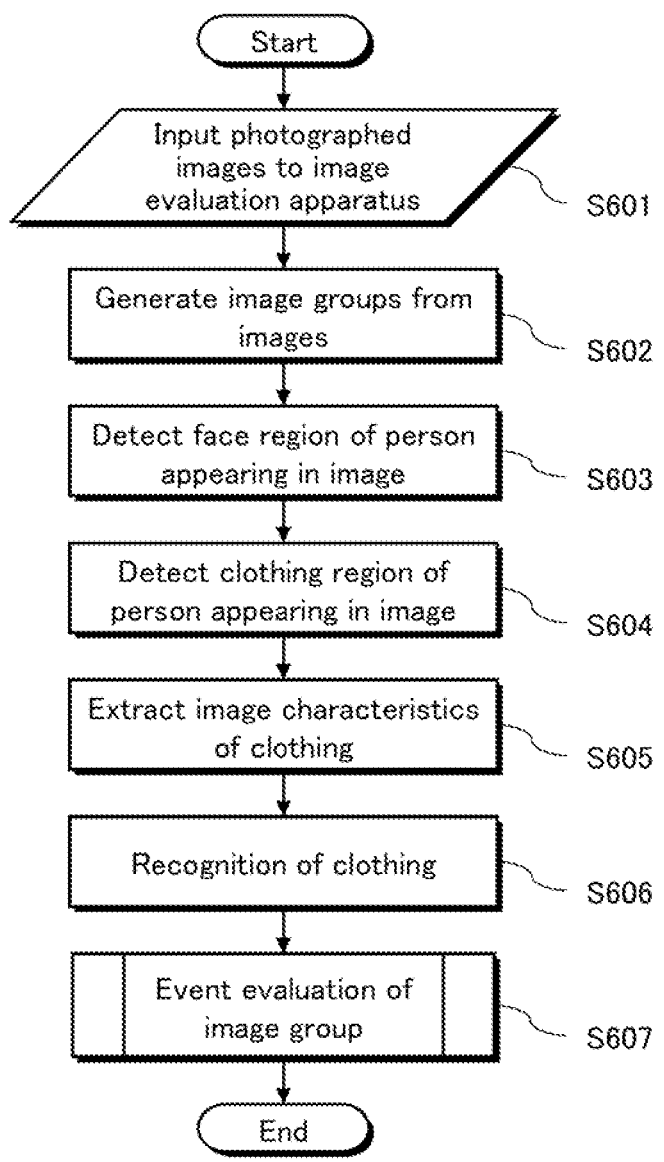

CLOTHING IMAGE ANALYSIS APPARATUS, METHOD, AND INTEGRATED CIRCUIT FOR IMAGE EVENT EVALUATION

TECHNICAL FIELD

The present invention relates to an image evaluation apparatus that evaluates images by making use of information pertaining to clothing.

BACKGROUND OF INVENTION

Background Art

Digital image photography devices such as digital still cameras and mobile phones having camera functions have gained much popularity. As recording media for storing images taken by using such digital image photography devices, high-capacity recording media, such as hard disks, are being provided to users.

A user, when using a high-capacity recording medium, is able to store a large number of images. However, when a user stores a large number of images to a high-capacity recording medium, the user experiences difficulty in searching for a desired image among the large number of images stored to the high-capacity recording medium.

As a method for enabling a user to easily find a desired image from among a large number of images, a method is known of organizing images by performing classification of the images according to the events at which the images were taken (here, the term "events" refer to such events as a school entrance ceremony and a school sports day). As one example of such a method, Patent Literature 1, introduces a method of performing recognition of the clothing that people appearing in the images are wearing, performing an evaluation of determining the events at which the images were taken according to the results of the recognition, and classifying the images according to the results of the evaluation.

When performing recognition of the clothing that a person appearing in an image is wearing, it is necessary to detect a region of the image determinable as corresponding to the clothing that the person is wearing (such a region is hereinafter referred to as a "clothing region") and to extract image characteristics from the clothing region so detected. Examples of image characteristics extractable from a clothing region include a ratio of colors in the clothing region and a value indicative of change in luminance between adjacent pixels in the clothing region.

CITATION LIST

Patent Literature

[Patent Literature 1]
  Japanese Patent Application Publication No. 2009-301119

SUMMARY OF INVENTION

However, when performing recognition by using image characteristics, it is difficult to accurately detect a clothing region in an image since the clothing region changes when the pose of the corresponding person changes. In addition, the image characteristics extractable from a clothing region change according to the direction that the corresponding person is facing and/or the illumination used. As such, there are cases where recognition of the clothing that a person appearing in an image is wearing cannot be performed correctly when performing recognition by using image characteristics.

Due to this, an apparatus that evaluates an image according to the clothing that a person appearing in the image is wearing may evaluate the image incorrectly when recognition of the clothing that the person appearing in the image is wearing is performed incorrectly.

In view of such a problem, the present invention provides an image evaluation apparatus that is capable of evaluating an image correctly even when recognition of the clothing that a person appearing in the image is wearing is performed incorrectly.

One aspect of the present invention is an image evaluation apparatus that evaluates images in an image group, comprising: a first specification unit that specifies, for each person appearing in each of the images, a type of clothing that the person is wearing as a first clothing type; a second specification unit that specifies a type of clothing characterizing the image group as a second clothing type according to a frequency of appearance of each of different first clothing types specified from the images in the image group; and an evaluation unit that evaluates the images in the image group by determining, according to the second clothing type, an event at which the images in the image group have been taken.

According to the image evaluation apparatus pertaining to one aspect of the present invention, even when recognition of the clothing that a person appearing in a given image is wearing is performed incorrectly, evaluation of the given image is performed correctly due to reference being made to the frequency at which different types of clothing appear in a plurality of images including the given image.

BRIEF DESCRIPTION OF THE DRAWINGS

FIG. 2 illustrates one example of an image management information table.

FIG. 3 illustrates one example of a people management information table.

FIGS. 4A though 4C illustrate three example images, face regions detected in the example images, and clothing regions detected in the example images.

FIG. 6 is a flowchart illustrating processing performed by the image evaluation apparatus 100 in embodiment 1.

DETAILED DESCRIPTION OF INVENTION

<Overview of Invention>

A person taking images usually takes a plurality of images at one event. When conventional technology is applied, an image taken at a given event can be correctly evaluated as having been taken at the given event when the clothing appearing in the image is recognized correctly. On the other hand, it is difficult to correctly evaluate an image taken at a given event as having been taken at the given event when the clothing appearing in the image is not recognized correctly. According to the present invention, an image can be evaluated correctly even when recognition of the clothing appearing in the image is performed incorrectly. This owes to information pertaining to another image whose clothing has been correctly recognized being used in the evaluation of the image.

<Embodiment 1>

In the following, description is provided on an image evaluation apparatus 100 pertaining to one embodiment of the present invention, with reference to the accompanying figures.

<Structure>

Figure 1:
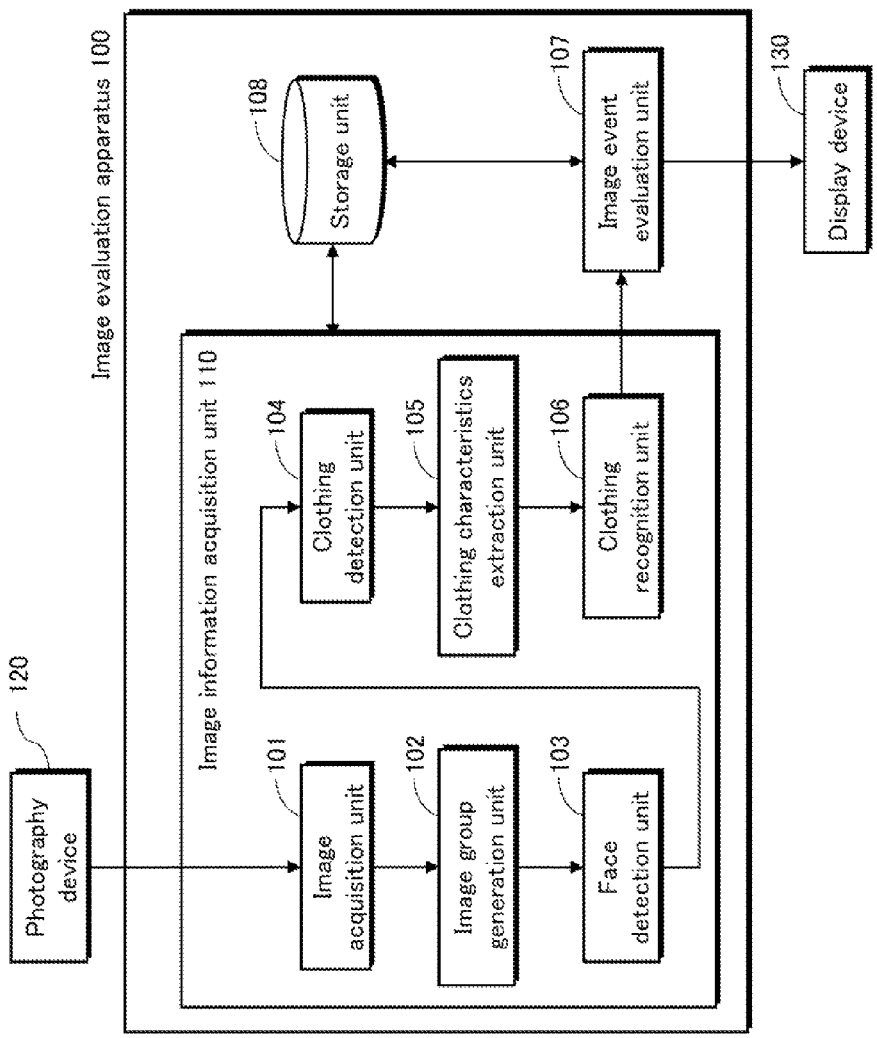
FIG. 1 is a functional block diagram of an image evaluation apparatus 100 in embodiment 1.

FIG. 1 is a functional block diagram of the image evaluation apparatus 100 in embodiment 1. As illustrated in FIG. 1, the image evaluation apparatus 100 is connected with a photography device 120 and a display device 130.

The image evaluation apparatus 100 acquires a group of images from the photography device 120, performs evaluation of the images, and outputs the images in accordance with the results of the evaluation to the display device 130.

The photography device 120 photographs images and accumulates the images. The photography device 120 is, for instance, implemented as a digital camera or the like, and is connected with the image evaluation apparatus 100 via a Universal Serial Bus (USB) cable or the like.

The display device 130 displays images such as those output from the image evaluation apparatus 100. The display device 130 is, for instance, implemented as a digital television or the like, and is connected with the image evaluation apparatus 100 via a High Definition Multimedia Interface (HDMI) cable or the like.

In the following, description is provided on a functional structure of the image evaluation apparatus 100 pertaining to the present embodiment. The image evaluation apparatus 100 includes an image information acquisition unit 110, an image event evaluation unit 107, and a storage unit 108. The image information acquisition unit 110 includes an image acquisition unit 101, an image group generation unit 102, a face detection unit 103, a clothing detection unit 104, a clothing characteristics extraction unit 105, and a clothing recognition unit 106.

The image acquisition unit 101 collectively acquires a group of images accumulated by the photography device 120, and provides each of the acquired images with a unique image ID. The image acquisition unit 101 registers the image IDs provided to the acquired images to an image management information table 201 illustrated in FIG. 2. The image management information table 201 is stored in the storage unit 108.

The image group generation unit 102 classifies the images acquired by the image acquisition unit 101 into a plurality of image groups. The image group generation unit 102 generates image groups by, for instance, classifying images having been taken on the same date into the same image group. The image group generation unit 102 provides each image classified into a given image group with an image group ID uniquely corresponding to the given image group. Specifically, the image group generation unit 102 acquires a photography date/time of each of the acquired images from Exchangeable Image File Format (EXIF) information provided to each of the acquired images and uses the EXIF information so as to classify the acquired images into image groups. The image group generation unit 102 registers, for each of the acquired images, a photography date/time and an image group ID of the image group into which the image has been classified to the image management information table 201.

The face detection unit 103 detects, in each of the images acquired by the image acquisition unit 101, a square region (represented by coordinates in the image) corresponding to each person's face appearing in the image (hereinafter referred to as a "face region"). The face detection unit 103 provides each of the faces detected from the acquired images with a unique face ID. The face detection unit 103 registers the face IDs to the image management information table 201 and a people management information table 301 illustrated in FIG. 3. The people management information table 301 is stored in the storage unit 108. The detection of face regions in the acquired images is performed through matching by using a face learning dictionary. The face learning dictionary is prepared in advance and is composed of a plurality of face images.

The clothing detection unit 104 detects, for a face region having been detected in a given one of the acquired images by the face detection unit 103, a region in the given image in which the clothing worn by the person corresponding to the face region appears (hereinafter referred to as a "clothing region"). The detection of a clothing region is performed according to coordinates of the corresponding face region. Specifically, a clothing region can be calculated from (i) a position and a size of a corresponding face region and (ii) a predetermined ratio between the face, the neck, and the upper half of the body of people appearing in the images. The clothing detection unit 104 manages each clothing region so detected in association with the corresponding face ID.

In the following, description is provided on a specific example of a method of calculating a clothing region by using a face region, with reference to FIGS. 4A, 4B, and 4C. As in image 401 illustrated in FIG. 4A, when a face region detected by the face detection unit 103 has a size of 1.0×1.0, (height× width), a corresponding clothing region is defined as a region having a size of 2.8×2.0, (height×width) located 0.2, lower in a height direction of the image from the lower end of the face region. That is, for instance, when a face region detected by the face detection unit 103 has a size of 100, pixels×100, pixels (height×width), a corresponding clothing region is a region having a size of 280×200, pixels (height×width) located 20 pixels lower in the height direction from the lower end of the face region.

Since a clothing region is calculated automatically according to a corresponding face region, there are cases as illustrated in image 402 in FIG. 4B where a region detected as a clothing region extends over image boundaries. In such a case, a portion of the detected clothing region lying within the image boundaries is determined as a clothing region. For instance, in the example illustrated in FIG. 4B, only the shaded portion of the detected clothing region 402a', which lies within the image boundaries, is actually determined as a clothing region.

Further, when a region detected as a clothing region for a given person overlaps a face region of another person as in the case of image 403 illustrated in FIG. 4C, a portion of the detected clothing region that does not overlap the face region of the other person is actually determined as the clothing region for the given person. In addition, when two or more regions detected as clothing regions overlap each other as also illustrated in image 403 in FIG. 4C, assuming that a first person whose face region appears lower in the height direction of an image appears in front, in the camera direction, of a second person whose face region appears higher in the height direction of the image, the clothing region for the second person is determined as a portion of the detected clothing region not overlapping the clothing region for the first person. This is based on the assumption that, when the first person appearing in front of the second person in the image is taller than the second person, the second person would be hidden by the first person in the image, and hence, the face region of the second person would not be detected in the image.

In the example illustrated in image 403 illustrated in FIG. 4C, two face regions, namely face region 403a, and face region 403b, are detected. When comparing the two face regions so detected, the face region 403b, is detected lower in the height direction of the image 403 than the face region 403a. As such, when clothing regions 403a' and 403b' respectively corresponding to the face regions 403a and 403b, overlap each other, the clothing region 403b' corresponding to the face region 403b, is preferentially detected. With regards to the clothing region corresponding to the face region 403a, a cross-hatched portion of the clothing region 403a', which does not overlap the clothing region 403b', is determined as the clothing region corresponding to the face region 403a.

Figure 5A:
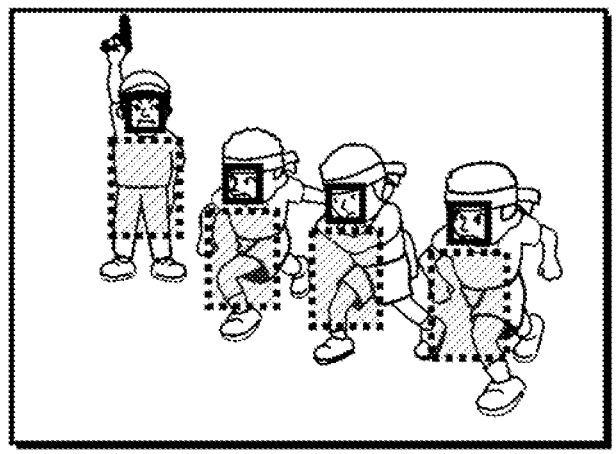
FIGS. 5A and 5B illustrate two example images, face regions detected in the example images, and clothing regions detected in the example images.
Figure 5B:
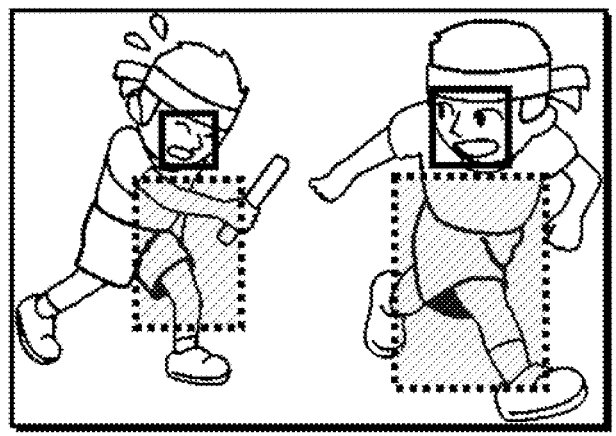

FIGS. 5A and 5B illustrate two example images, face regions detected in the example images by the face detection unit 103, and clothing regions detected in the example images by the clothing detection unit 104. In FIGS. 5A and 5B, regions enclosed by solid lines indicate face regions, and regions enclosed by dotted lines indicate clothing regions corresponding to the face regions having been detected.

Returning to FIG. 1, the clothing characteristics extraction unit 105 extracts image characteristics for the clothing regions detected by the clothing detection unit 104. In general, image characteristics indicate characteristics of a distribution of pixel values pertaining to a plurality of pixels in an image. Here, image characteristics for a clothing region include, for instance, a ratio of colors appearing within the clothing region and an amount of change in luminance between adjacent pixels in the clothing region. The clothing characteristics extraction unit 105 registers the image characteristics extracted from the clothing regions to the people management information table 301.

The clothing recognition unit 106, according to the image characteristics for each clothing region registered to the people management information table 301, determines the type of clothing (hereinafter simply referred to as a "clothing type") appearing in the clothing region. The determination of clothing types is performed by providing a classifier that is capable of determining clothing types according to image characteristics and causing the classifier to determine a clothing type corresponding to each face ID. The classifier is provided with the capability of determining clothing types by being subjected to learning according to the Support Vector Machine (SVM) method in advance. The clothing types of the clothing regions corresponding to the face IDs, recognition of which is performed by the clothing recognition unit 106, are referred to as first clothing types. The clothing recognition unit 106 registers the first clothing types having been specified to the people management information table 301. For instance, in FIG. 3, the first clothing types for the people identified by face IDs 2 and 3 commonly indicate a "school gym uniform" clothing type. It should be noted that there may be cases where the clothing that a person identified by a given face ID is wearing is specified as not belonging to any clothing type, as is the case with the person identified by face ID 1 in FIG. 3.

The image event evaluation unit 107 performs event evaluation with respect to each image group according to the contents of the image management information table 201 and the contents of the people management information table 301. Details of how event evaluation is performed are described later. Note that here, "event evaluation" refers to an evaluation of associating an evaluation-target image group or an evaluation-target image with a corresponding event.

Figure 8:
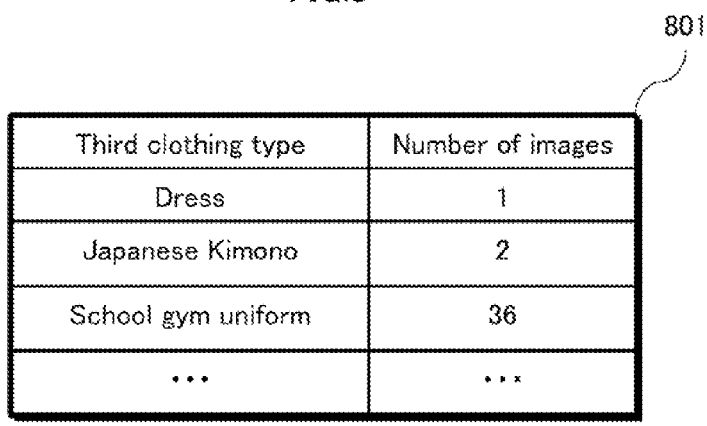
FIG. 8 illustrates one example of a table indicating third clothing types and the number of images characterized by each third clothing type.
Figure 9:
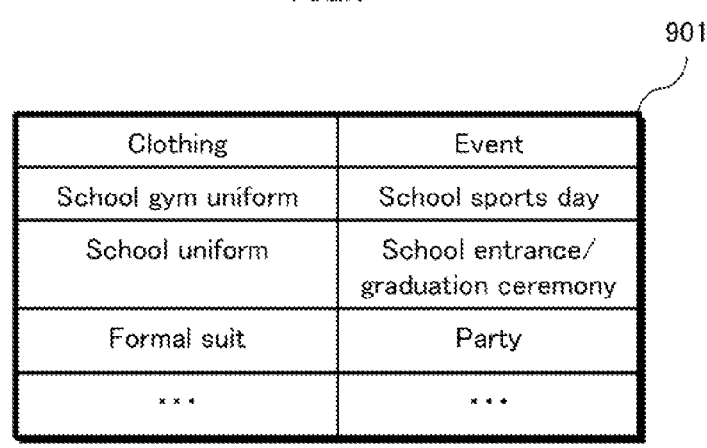
FIG. 9 illustrates one example of a table indicating a correspondence between clothing types and events.
Figure 10:
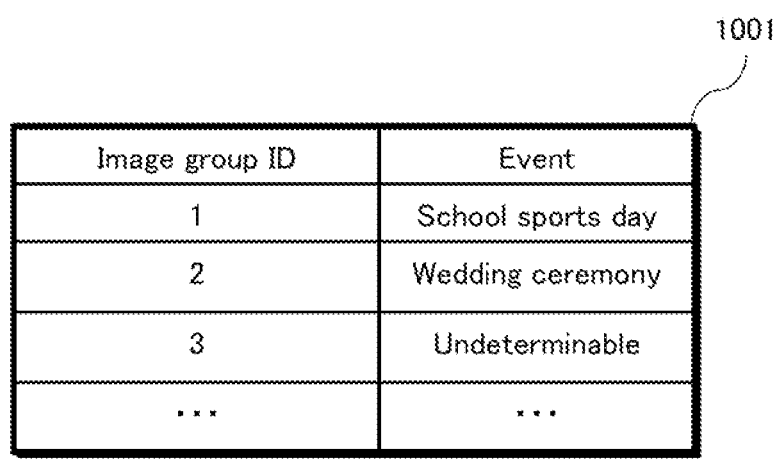
FIG. 10 illustrates one example of a table indicating results of event evaluation performed with respect to image groups.

The storage unit 108 stores: the image management information table 201 indicating, for each image ID, a corresponding photography date/time, a corresponding image group ID, and a face ID of each face appearing in the image; the people management information table 301 indicating, for each face ID, image characteristics extracted from a corresponding clothing region and a corresponding first clothing type; and later-described tables 801, 901, and 1001 respectively illustrated in FIGS. 8, 9, and 10. The table 801 indicates third clothing types and the number of images characterized by each third clothing type, the table 901 indicates a correspondence between clothing types and events, and the table 1001 indicates results of event evaluation performed with respect to image groups.

The image evaluation apparatus 100 includes a processor and a memory that are not illustrated in FIG. 1, and each of the functional units of the image evaluation apparatus 100 are realized by the processor executing a program stored to the memory.

<Operations>

In the following, description is provided on operations of the image evaluation apparatus 100 pertaining to the present embodiment, with reference to the flowchart illustrated in FIG. 6.

First, the image acquisition unit 101 acquires images accumulated by the photography device 120, and registers an image ID uniquely provided to each of the acquired images to the image management information table 201 (Step S601).

The image group generation unit 102 generates image groups from the images acquired by the image acquisition unit 101, and registers an image group ID uniquely provided to each image group to the image management information table 201 (Step S602).

The face detection unit 103 detects, in each of the acquired images, face regions each corresponding to a person's face, and registers a face ID uniquely provided to each of the faces to the image management information table 201 and the people management information table 301 (Step S603).

The clothing detection unit 104 detects, according to the face regions detected by the face detection unit 103, a clothing region corresponding to each face region (Step S604).

The clothing characteristics extraction unit 105 extracts image characteristics for each clothing region detected by the clothing detection unit 104, and registers image characteristics corresponding to each of the clothing regions to the people management information table 301 (Step S605).

The clothing recognition unit 106 specifies a first clothing type for each person appearing in each of the acquired images according to the image characteristics for the clothing regions registered to the people management information table 301, and registers the results of the specification to the people management information table 301 (Step S606).

Figure 7:
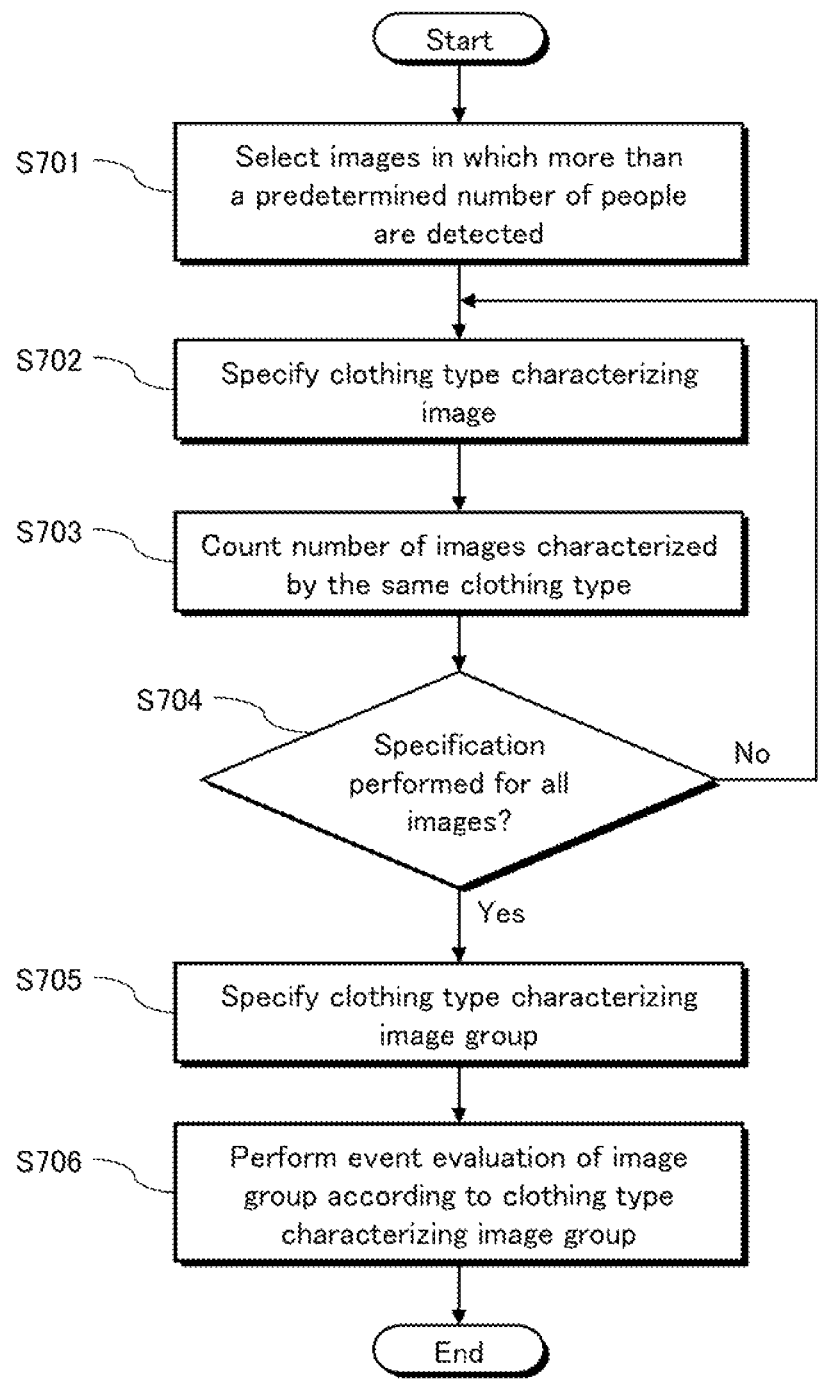
FIG. 7 is a flowchart illustrating processing performed by an image event evaluation unit 107 in embodiment 1.

The image event evaluation unit 107 performs event evaluation of each of the image groups based on the contents of the image management information table 201 and the contents of the people management information table 301, which are created through the execution of the processing in Steps S601 through S606 (Step S607). FIG. 7 is a flowchart illustrating details of Step S607, where the image event evaluation unit 107 performs event evaluation with respect to one evaluation-target image group.

The image event evaluation unit 107 selects, from among the images in the evaluation-target image group, images each including at least a predetermined number of people (Step S701). Here, the image event evaluation unit 107 selects, from among the images in the evaluation-target image group, images each including at least two people so as to perform event evaluation with respect to the images in the evaluation-target image group according to the clothing that a plurality of people appearing in the images are wearing. The number of people appearing in each image is determinable from the number of face IDs registered to a face ID field of the image management information table 201.

The image event evaluation unit 107 selects one image from among the images selected in Step S701, and specifies, as a clothing type characterizing the image (hereinafter referred to as a "third clothing type"), a first clothing type satisfying a first criterion in the image (Step S702). Here, a given first clothing type is determined as satisfying the first criterion when a ratio of the number of clothing in the image corresponding to the given first clothing type to the total number of clothing appearing in the image exceeds 0.5. That is, when more than half of the people appearing in the image are commonly wearing clothing of a given clothing type, the image event evaluation unit 107 specifies the given clothing type as the third clothing type characterizing the image.

In the following, explanation is provided of a specific example of the operations involved in Step S702, with reference to the image management information table 201 illustrated in FIG. 2 and the people management information table 301 illustrated in FIG. 3. In this example, an image identified by image ID 1 is selected in Step S702 by the image event evaluation unit 107. Further, according to the image management information table 201, four people identified by face IDs 1 through 4 appear in the image. In addition, according to the people management information table 301, the first clothing types for the three people identified by face IDs 2 through 4 commonly indicate the "school gym uniform" clothing type while the first clothing type for the person identified by face ID 1 indicates an "unspecified" clothing type. Here, when a first clothing type for a given person indicates the "unspecified" clothing type, the clothing type for the given person is a clothing type specified as not belonging to any specific clothing type. As such, the ratio of the number of people in the image wearing school gym uniforms to the total number of people appearing in the image is calculated as 3/4=0.75. Since the ratio (0.75) of the number of people wearing school gym uniforms (3) to the total number of people appearing in the image (4) exceeds 0.5, the "school gym uniform" clothing type satisfies the first criterion. As such, the image event evaluation unit 107 specifies the "school gym uniform" clothing type as the third clothing type for the image identified by image ID 1.

Subsequently, the image event evaluation unit 107 counts the number of images characterized by the same third clothing type (Step S703). Specifically, the image event evaluation unit 107 creates the table 801 illustrated in FIG. 8 indicating third clothing types and the number of images characterized by each third clothing type. Further, when a given third clothing type is specified as characterizing a given image in Step S702, the image event evaluation unit 107 increments, by one, the value in the field indicating the number of images characterized by the given clothing type.

Following this, the image event evaluation unit 107 determines whether or not the above-described processing has been performed with respect to all of the image having been selected in Step S701 (Step S704). Processing proceeds to Step S705 when determining affirmatively in Step S704 while processing returns to Step S702 when determining negatively in Step S704.

When determining affirmatively in Step S704, the image event evaluation unit 107 specifies a clothing type characterizing the image group (hereinafter referred to as a "second clothing type") by specifying a clothing type satisfying a second criterion in the image group (Step S705). Here, a given third clothing type is determined as satisfying the second criterion when a ratio of the number of images characterized by the given third clothing type to the total number of images in the image group selected in Step S701 exceeds 0.5. That is, when more than half of the people appearing in an image are wearing clothing of a given clothing type in more than half of the images in the image group in which at least two people appear, the image event evaluation unit 107 specifies the given clothing type as the second clothing type characterizing the image group.

In the following, description is provided on a specific example of the processing in Step S705, with reference to the table 801 illustrated in FIG. 8 indicating third clothing types and the number of images characterized by each third clothing type. In this example, fifty images have been selected in Step S701 from among the images in the image group. Further, the ratio of the number of images characterized by the "school gym uniform" clothing type to the total number of images selected in S701 is calculated as 36/50=0.72. Since the ratio (0.72) of the number of images characterized by the "school gym uniform" clothing type (36) to the total number of images selected in S701 (50) exceeds a predetermined ratio (0.5), the "school gym uniform" clothing type satisfies the second criterion. As such, the image event evaluation unit 107 specifies the "school gym uniform" clothing type as the second clothing type for the evaluation-target image group.

The image event evaluation unit 107 performs event evaluation with respect to the image group according to the second clothing type (Step S706). Specifically, the image event evaluation unit 107 specifies an event associated with the second clothing type for the image group by referring to the table 901 stored in advance to the storage unit 108, and associates the image group with the specified event. The table 901, which is illustrated in FIG. 9, indicates the correspondence between clothing types and events. In addition, the image event evaluation unit 107 provides each of the images belonging to the image group with an event tag indicating the specified event.

The image evaluation apparatus 100 performs event evaluation as described above with respect to all of the image groups having been generated. FIG. 10 illustrates an example of results of event evaluation performed with respect to image groups.

Finally, the image evaluation apparatus 100 outputs each of the images acquired by the image acquisition unit 101 to the display device 130 such that the results of the evaluation performed with respect to the images are displayed by the display device 130. For instance, the image evaluation apparatus 100 outputs each image to the display device 130 such that an event name of an event tag provided to the image is composed with the image.

<Conclusion>

The image evaluation apparatus 100 pertaining to the present embodiment performs event evaluation of images included in an image group constituted of at least two images according to the frequency of appearance, in the image group, of images characterized by each different clothing type.

Even when recognition of clothing that a plurality of people are wearing in a small number of images in the image group is performed incorrectly, the image evaluation apparatus 100 pertaining to the present invention is able to correctly evaluate the small number of images with respect to which recognition of clothing has been performed incorrectly provided that the recognition of clothing that people are wearing is correctly performed for a majority of the images in the image group. In short, the image evaluation apparatus 100 pertaining to the present embodiment is capable of evaluating images with higher accuracy compared to when evaluation is performed of images one-by-one.

<Embodiment 2>

In embodiment 1, event evaluation of images is performed based on only the information pertaining to the clothing appearing in the images, recognition of which is performed by the clothing recognition unit 106. In embodiment 2, event evaluation of images is performed by using, in addition to the information utilized in embodiment 1, the similarity between clothing worn by people appearing in the images based on the assumption that, when the clothing that one person in an image is wearing is similar to the clothing that another person in the image is wearing, the clothing worn by the two people belong to the same clothing type. Note that in the following, structures and data similar to those in embodiment 1, are provided with the same reference signs and description thereon is omitted.

<Structure>

Figure 11:
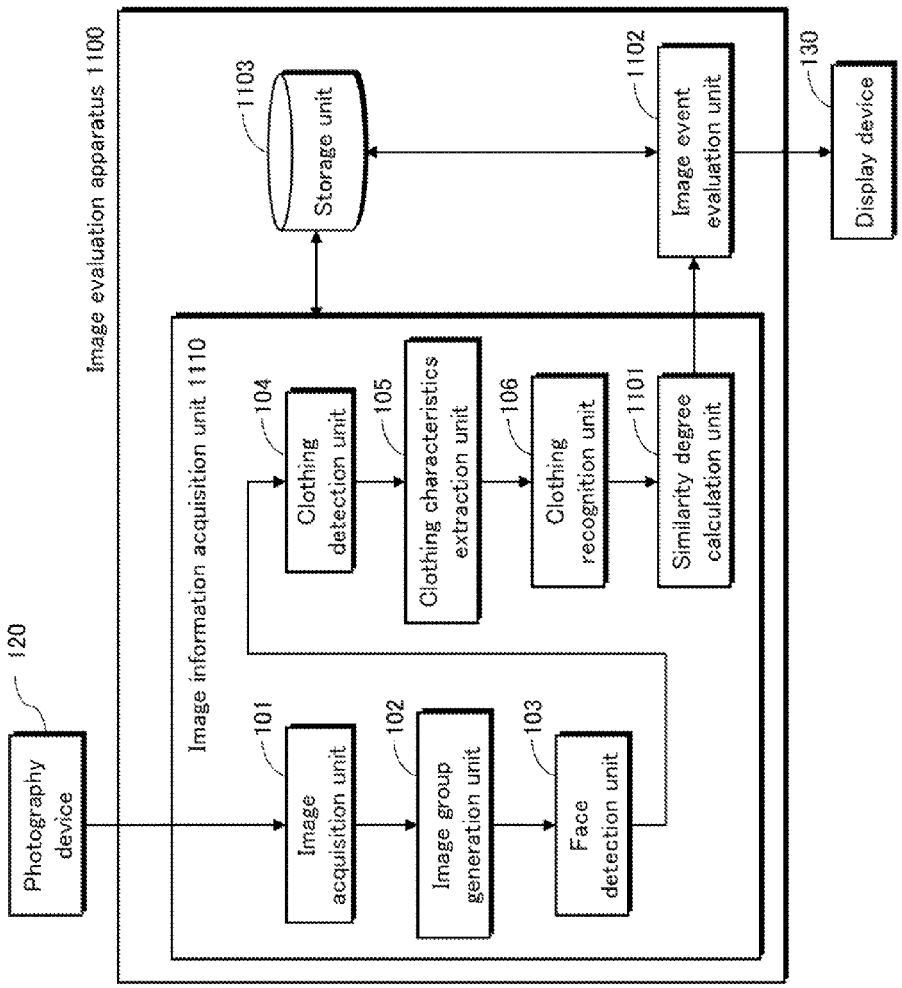
FIG. 11 is a functional block diagram of an image evaluation apparatus 1100 in embodiment 2.

In the following, description is provided on an image evaluation apparatus 1100 pertaining to the present embodiment. FIG. 11 is a functional block diagram of the image evaluation apparatus 1100 in embodiment 2. In the image evaluation apparatus 1100, the image event evaluation unit 107, the storage unit 108, and the image information acquisition unit 110 in embodiment 1, are respectively replaced with an image event evaluation unit 1102, a storage unit 1103, and an image information acquisition unit 1110. The image information acquisition unit 1110 includes, in addition to the structure of the image information acquisition unit 110, a similarity degree calculation unit 1101.

The similarity degree calculation unit 1101 calculates, for each combination of two people appearing in a given image, a similarity degree indicating similarity between a combination of clothing worn by the two people according to the image characteristics pertaining to clothing registered to the people management information table 301. The similarity degree calculation unit 1101 registers the similarity degree for each combination of clothing in a given image to a table 1201 illustrated in FIG. 12, which indicates similarity between clothing that people in an image are wearing. The table 1201 is held by the storage unit 1103. Specifically, a similarity degree between a combination of clothing appearing in an image is calculated as a cosine similarity between two vectors each representing image characteristics of clothing worn by a corresponding person.

The image event evaluation unit 1102 performs event evaluation of each image group based on the contents of the image management information table 201, the contents of the people management information table 301, and the contents of the table 1201 indicating similarity between the clothing that people in an image are wearing. Details of how event evaluation is performed are described later.

The storage unit 1103 stores the table 1201 indicating similarity between the clothing that people in an image are wearing, in addition to the image management information table 201, the people management information table 301, the table 801 indicating third clothing types and the number of images characterized by each third clothing type, the table 901 indicating the correspondence between clothing types and events, and the table 1001 indicating results of event evaluation performed with respect to image groups.

<Operations>

Figure 13:
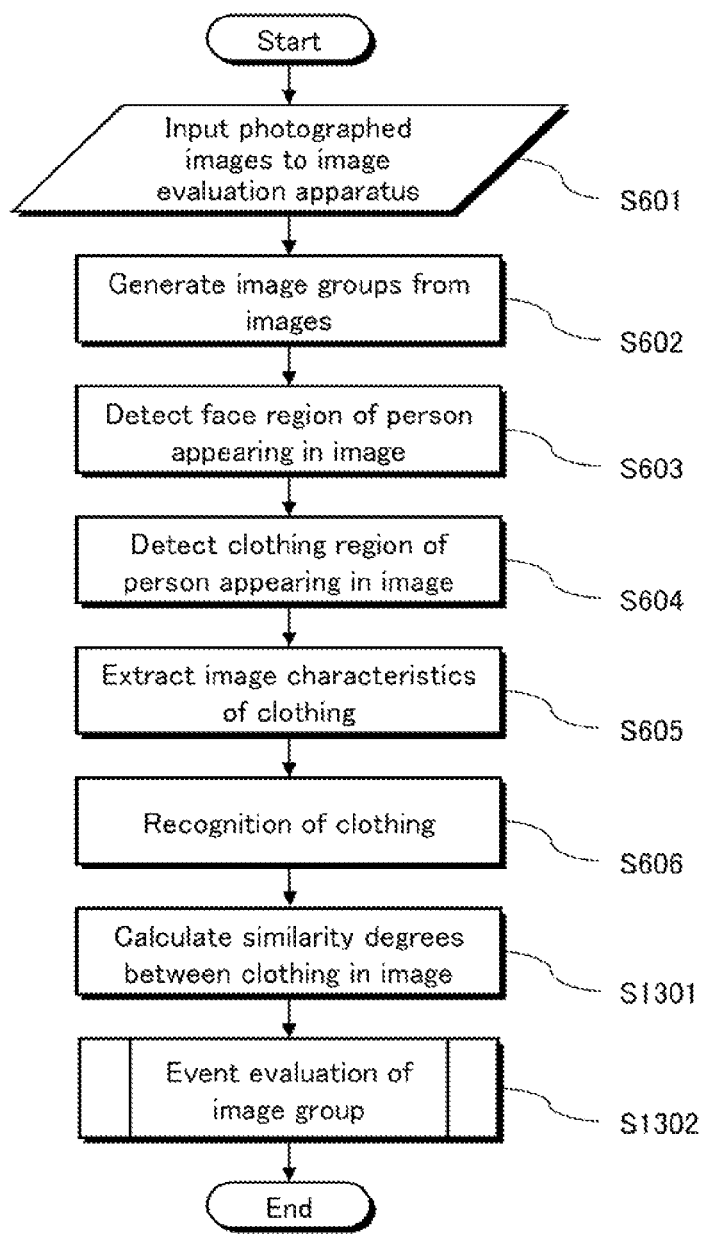
FIG. 13 is a flowchart illustrating processing performed by the image evaluation apparatus 1100 in embodiment 2.

In the following, description is provided on operations of the image evaluation apparatus 1100 pertaining to the present embodiment, with reference to the flowchart illustrated in FIG. 13. In the following, description on the processing performed in each of Steps S601 through S606 is omitted for being similar as the corresponding processing in embodiment 1.

The similarity degree calculation unit 1101 calculates a similarity degree for each combination of clothing appearing in each image according to the image characteristics pertaining to clothing registered to the people management information table 301 (Step S1301).

Figure 14:
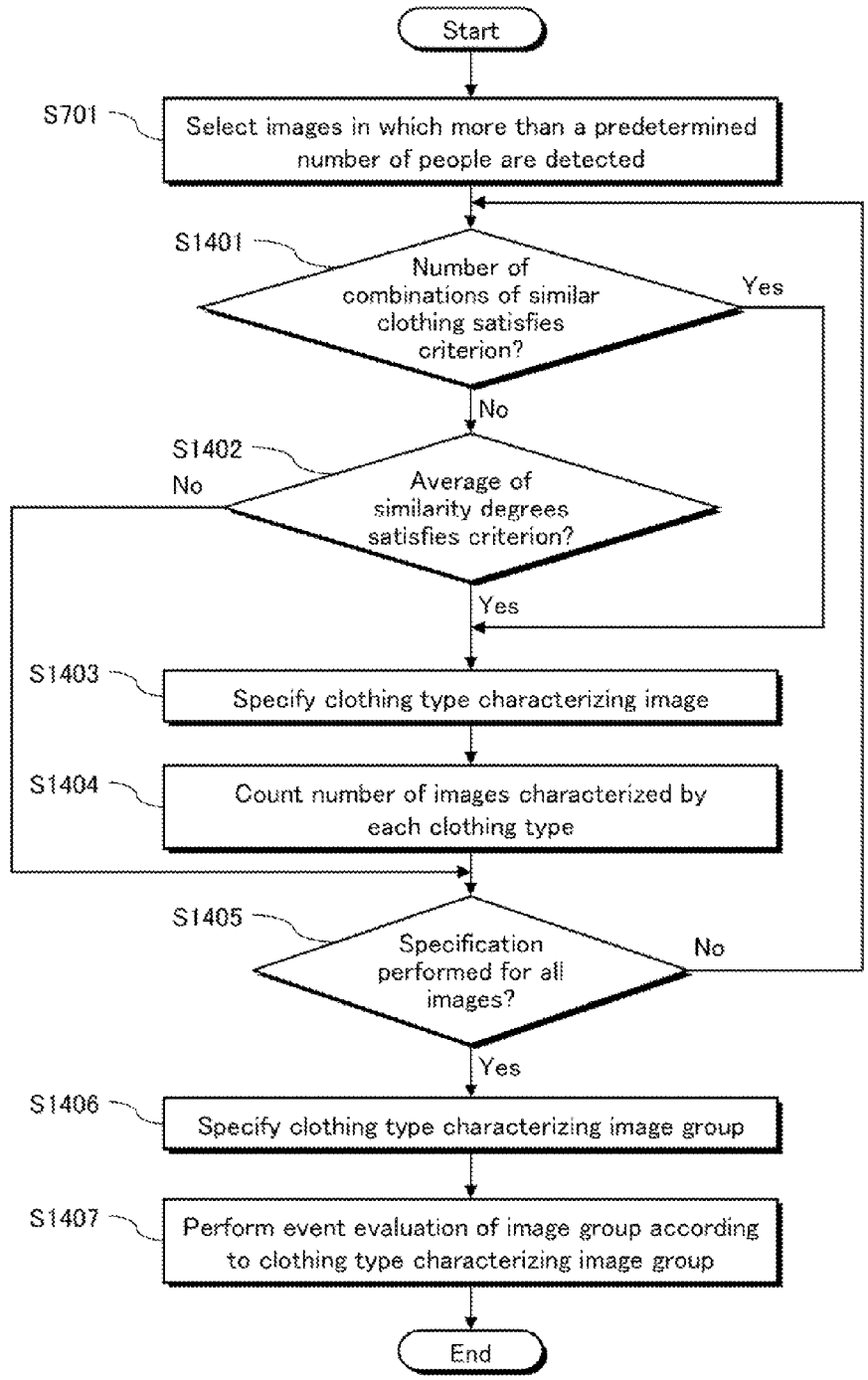
FIG. 14 is a flowchart illustrating processing performed by an image event evaluation unit 1102 in embodiment 2.

The image event evaluation unit 1102 performs event evaluation of image groups based on the contents of the image management information table 201, the contents of the people management information table 301, and the contents of the table 1201 indicating similarity between the clothing that people in an image are wearing (Step S1302). FIG. 14 is a detailed flowchart illustrating operations involved in Step S1301, where the image event evaluation unit 1102 performs event evaluation of one evaluation-target image group.

The image event evaluation unit 1102 selects, from among images included in the evaluation-target image group, images each including at least a predetermined number of people (Step S701).

The image event evaluation unit 1102 selects one image from among the images selected in Step S701, and determines whether or not combinations of clothing indicating similarity, among the clothing appearing in the selected image, satisfy a third criterion (Step S1401). Processing proceeds to Step S1403 when determining affirmatively in Step S1401 while processing proceeds to Step S1402 when determining negatively in Step S1401. Here, the expression "combination of clothing indicating similarity" refers to a combination of clothing worn by two people appearing in the image whose similarity degree, calculated by the similarity degree calculation unit 1101, exceeds 0.7. Here, combinations of clothing indicating similarity in an image satisfy the third criterion when a ratio of the number of the combinations of clothing indicating similarity to the total number of possible combinations of clothing appearing in the image exceeds 0.6.

Figure 12:
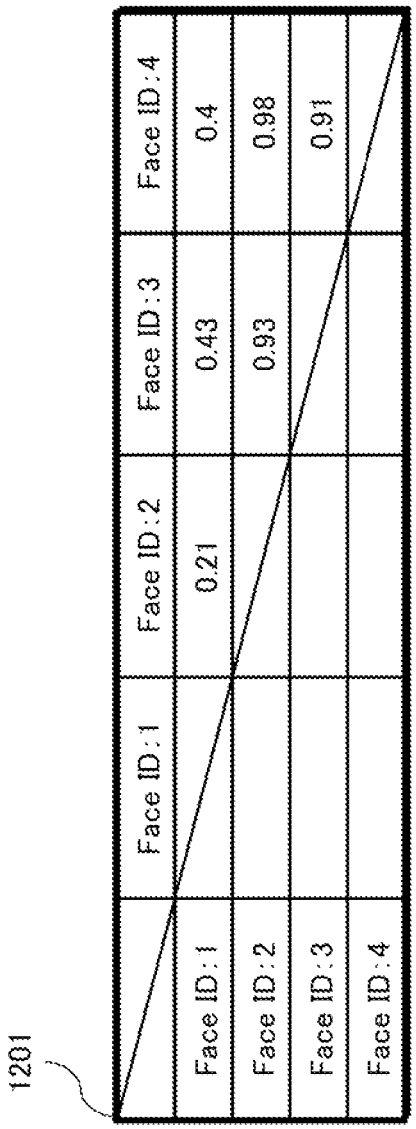
FIG. 12 illustrates one example of a table indicating similarity between clothing that people appearing in an image are wearing.

In the following, description is provided on a specific example of the processing in Step S1401, with reference to the table 1201 indicating similarity between clothing that people in an image are wearing illustrated in FIG. 12. More specifically, the table 1201 in FIG. 12 indicates similarity degrees for combinations of clothing worn by people appearing in an image identified by image ID 1. Four people identified by face IDs 1 through 4 appear in the image. As such, the total number of possible combinations of clothing in the image is calculated as $_4C_2=(4\times3)/(2\times1)=6$. In addition, according to the table 1201 indicating similarity between the clothing that people in an image are wearing, the number of combinations of clothing indicating similarity in the image is three, or that is, three combinations of face IDs, namely the combinations (2, 3), (2, 4), and (3, 4), correspond to combinations of clothing having similarity degrees exceeding the predetermined value 0.7. As such, the ratio of the number of combinations of clothing indicating similarity to the total number of possible combinations of clothing in the image is calculated as $3/6=0.5$. Since the ratio (0.5) of the number of combinations of clothing indicating similarity (3) to the total number of possible combinations of clothing in the image (6) is smaller than a predetermined value (0.6), the combinations of clothing indicating similarity in the image do not satisfy the third criterion.

Subsequently, the image event evaluation unit 1102 determines whether or not the combinations of clothing indicating similarity in the image selected in Step S1401 satisfy a fourth criterion (Step S1402). Processing proceeds to Step S1403 when determining affirmatively in Step S1402 while processing returns to Step S1405 when determining negatively in Step S1402. Here, the combinations of clothing indicating similarity in the image satisfy the fourth criterion when an average value of the similarity degrees for the combinations of clothing indicating similarity exceeds a value calculated by using a predetermined formula $0.9-(0.01\times N)$, where N indicates the number of combinations of clothing indicating similarity.

In the following, description is provided on a specific example of the processing in Step S1402, with reference to the table 1201 indicating similarity between clothing that people in an image are wearing illustrated in FIG. 12. Since there are three combinations of clothing indicating similarity in the image, which are identified by combinations of face IDs (2, 3), (2, 4), and (3, 4), the combinations of clothing indicating similarity in the image satisfy the fourth criterion when the average value of the similarity degrees for the three combinations of clothing exceed a value calculated as $0.9-(0.01\times 3)=0.87$, by using the predetermined formula. In this example, the average value of the similarity degrees for the three combinations of clothing indicating similarity is calculated as $(0.93+0.98+0.91)/3=0.94$. Since the average value of the similarity degrees for the combinations of clothing indicating similarity (0.94) exceeds a value (0.87) calculated by using the predetermined formula, the image event evaluation unit 1102 determines that the combinations clothing indicating similarity in the image satisfy the fourth criterion.

Subsequently, the image event evaluation unit 1102 specifies a clothing type characterizing the image selected in the processing in Step S1401 (i.e., a third clothing type for the image selected in the processing in Step S1401) by specifying a clothing type in the image satisfying a fifth criterion (Step S1403). Here, a first clothing type appearing in the image satisfying the fifth criterion is, for instance, a first clothing type having been specified as belonging to a specific clothing type by the clothing recognition unit 106 among the first clothing types for the clothing included in the combinations of clothing indicating similarity. Here, when two or more first clothing types for the clothing included in the combinations of clothing indicating similarity simultaneously satisfy the fifth criterion, the image event evaluation unit 1102 specifies, as the third clothing type for the image, a first clothing type common to a relatively great number of the clothing included in the combinations of clothing indicating similarity in the image selected through the processing in Step S1401.

In the following, description is provided on a specific example of the processing in Step S1403, with reference to the table 1201 indicating similarity between clothing that people in an image are wearing illustrated in FIG. 12 and the people management information table 301 illustrated in FIG. 3. In this example, there are three combinations of clothing indicating similarity, which are identified by combinations of face IDs (2, 3), (2, 4), and (3, 4). Hence, the people wearing clothing included in the three combinations of clothing indicating similarity are identified as the three people identified by face IDs 2, 3, and 4. According to the people management information table 301, the clothing that each of the three people indicated by face IDs 2, 3, and 4 is wearing in the image is specified as belonging to the "school gym uniform" clothing type by the clothing recognition unit 106. As such, the image event evaluation unit 1102 specifies the "school gym uniform" clothing type as the third clothing type characterizing the image.

Following this point, the image event evaluation unit 1102 performs processing corresponding to the processing performed by the image event evaluation unit 107 in Steps S703 through S706 in embodiment 1. Therefore, description concerning the processing performed by the image event evaluation unit 1102 following this point is provided in a simplified manner.

The image event evaluation unit 1102 counts the number of images in the image group characterized by the same third clothing type (Step S1404).

The image event evaluation unit 1102 determines whether or not the above-described processing has been performed with respect to all of the images having been selected in Step S701 (Step S1405). Processing proceeds to Step S1406 when determining affirmatively in Step S1405 while processing returns to Step S1401 when determining negatively in Step S1405.

When determining affirmatively in Step S1405, the image event evaluation unit 1102 specifies a clothing type characterizing the image group (i.e., the second clothing type) by specifying a clothing type satisfying a sixth criterion in the image group (Step S1406). Here, a given third clothing type is determined as satisfying the sixth criterion when, for instance, a ratio of the number of images characterized by the given third clothing type to the total number of images of the image group selected in Step S701 exceeds 0.5.

The image event evaluation unit 1102 performs event evaluation with respect to the image group according to the second clothing type (Step S1407).

The image evaluation apparatus 1100 performs event evaluation as described above with respect to all of the image groups having been generated. Finally, the image evaluation apparatus 1100 outputs each of the images acquired by the image acquisition unit 101 to the display device 130 such that the results of the evaluation performed with respect to the images are displayed by the displayed by the display device 130.

<Conclusion>

The image evaluation apparatus 1100 pertaining to embodiment 2, performs event evaluation of images included in an image group constituted of at least two images according to the frequency of appearance, in the image group, of images characterized by each different clothing type and the similarity between combinations of clothing in each image in the image group.

Even when, for instance, clothing that a person appearing in a given image, which actually belongs to the "school gym uniform" clothing type, is not specified as belonging to the "school gym uniform" clothing type as a result of incorrect recognition, there is a possibility that the image evaluation apparatus 1100 pertaining to the present embodiment can correctly specify the clothing as belonging to the "school gym uniform" clothing type by referring to the similarity between image characteristics of clothing appearing in the images. In short, the image evaluation apparatus 1100 pertaining to the present embodiment is capable of evaluating images with higher accuracy compared to the image evaluation apparatus 100 pertaining to embodiment 1.

<Embodiment 3>

In embodiment 1, event evaluation of images is performed by estimating the clothing that people appearing in the images are wearing based on only the information pertaining to the clothing appearing in the images, recognition of which is performed by the clothing recognition unit 106. In embodiment 3, event evaluation of images is performed by executing, in addition to the processing in embodiment 1, identification of a same person appearing in different images by performing clustering according to image characteristics of faces appearing in the images. Such processing is executed in embodiment 3, based on the assumption that a given person wears the same clothing throughout a given event. Note that in the following, structures and data similar to those in embodiment 1, are provided with the same reference signs and description thereon is omitted.

<Structure>

Figure 15:
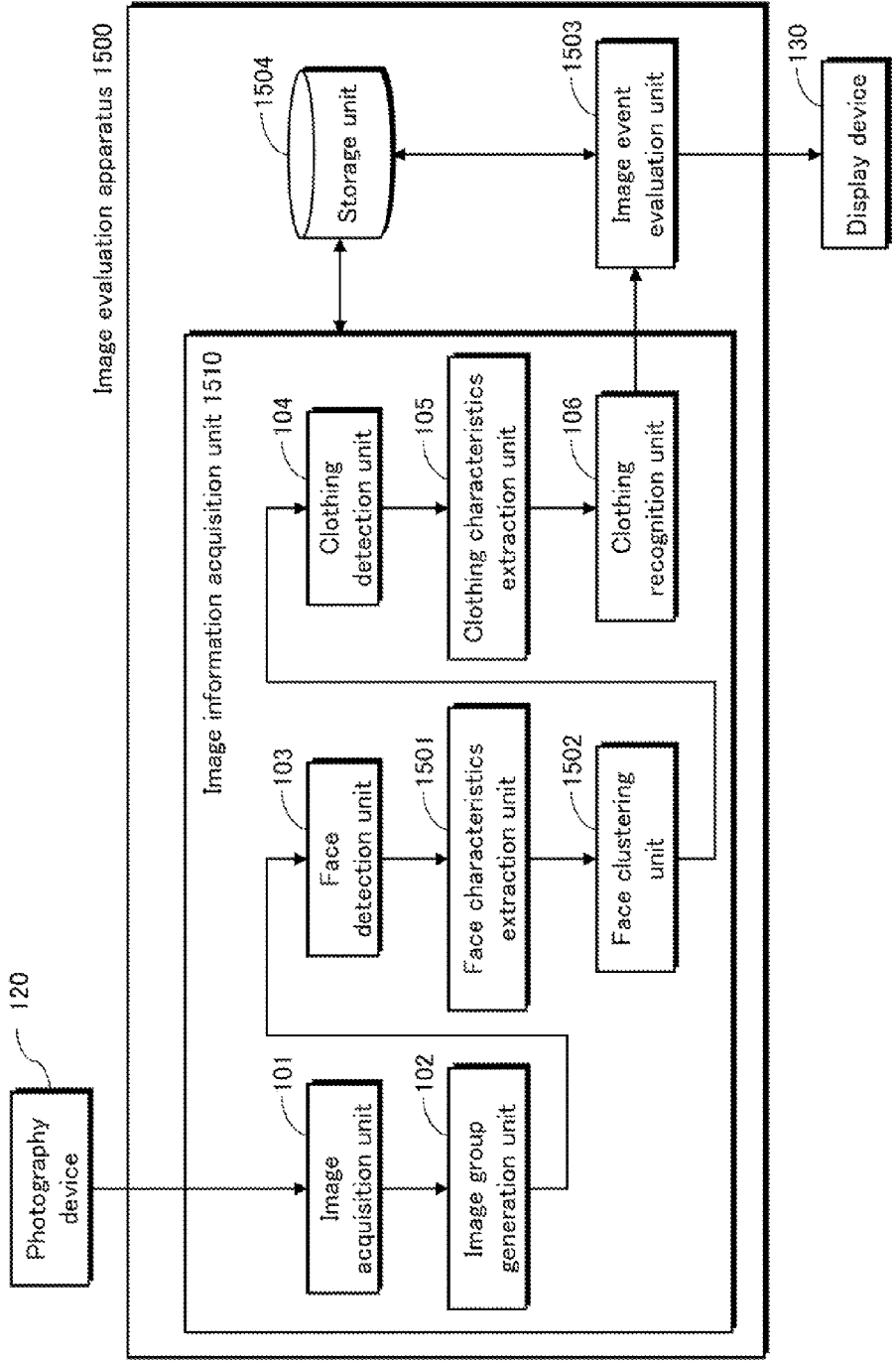
FIG. 15 is a functional block diagram of an image evaluation apparatus 1500 in embodiment 3.

In the following, description is provided on an image evaluation apparatus 1500 pertaining to the present embodiment. FIG. 15 is a functional block diagram of the image evaluation apparatus 1500 in embodiment 3. In the image evaluation apparatus 1500, the image event evaluation unit 107, the storage unit 108, and the image information acquisition unit 110 in the image evaluation apparatus 100 in embodiment 1, are respectively replaced with an image event evaluation unit 1503, a storage unit 1504, and an image information acquisition unit 1510. The image information acquisition unit 1510 includes, in addition to the structure of the image information acquisition unit 110, a face characteristics extraction unit 1501 and a face clustering unit 1502.

The face characteristics extraction unit 1501 extracts image characteristics pertaining to a face (hereinafter referred to as face image characteristics) from each face region detected by the face detection unit 103. The face characteristics extraction unit 1501 manages the face image characteristics so extracted in association with the corresponding face region.

Figure 16:
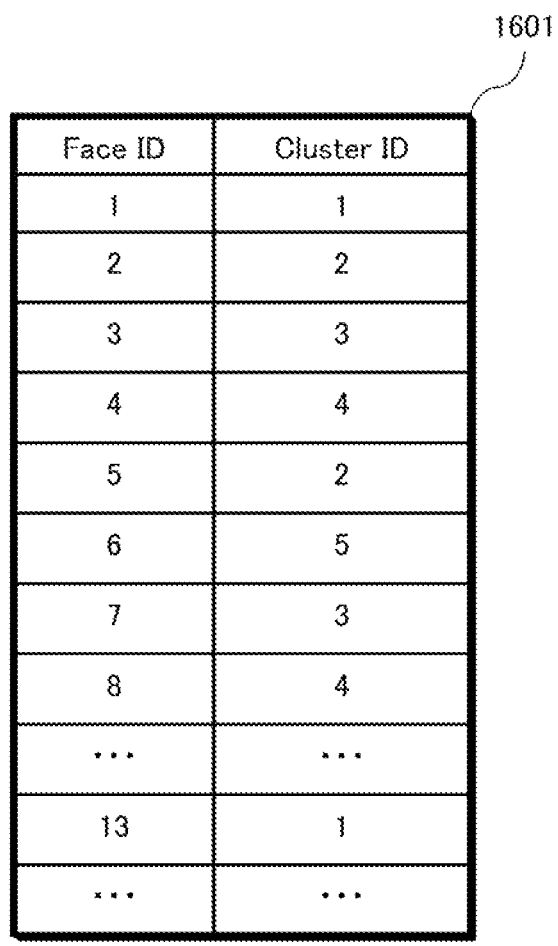
FIG. 16 illustrates one example of a table indicating faces and a cluster corresponding to each face.

The face clustering unit 1502 performs clustering according to the face image characteristics extracted by the face characteristics extraction unit 1501. Here, the clustering is performed such that faces appearing in a same image group that have similar face image characteristics are classified into the same cluster. The face clustering unit 1502 provides each of the clusters obtained as a result of the clustering with a unique cluster ID, and registers the cluster IDs to a table 1601 illustrated in FIG. 16, which indicates faces and a cluster corresponding to each face. The table 1601 is stored by the storage unit 1504. As indicated in the table 1601, faces classified into the same cluster can be estimated as corresponding to the same person.

The image event evaluation unit 1503 performs event evaluation of images in an image group according to the contents of the image management information table 201, the contents of the people management information table 301, and the contents of the table 1601 indicating faces and a cluster corresponding to each face. Details of how event evaluation is performed are described later.

Figure 19:
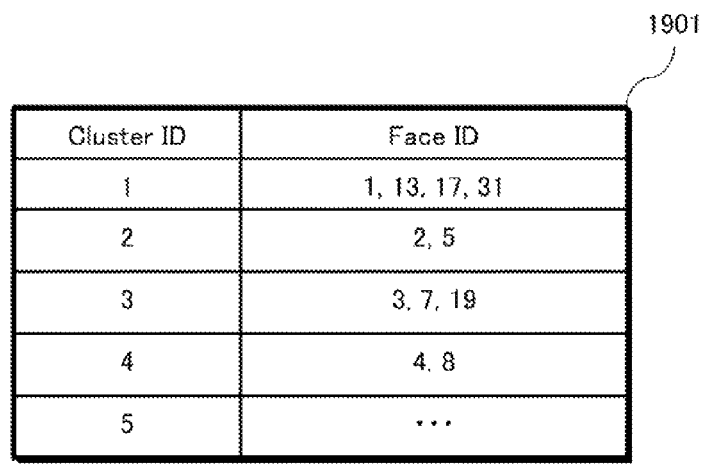
FIG. 19 illustrates one example of a table indicating clusters and faces belonging to each cluster.
Figure 20:
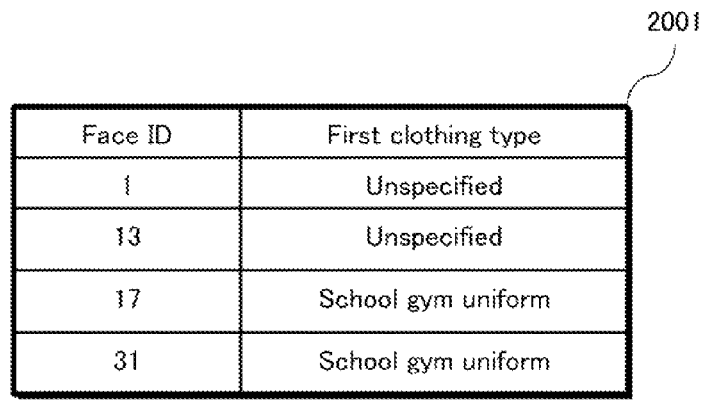
FIG. 20 illustrates one example of a table indicating faces belonging to a cluster and a first clothing type for each face.

The storage unit 1504 stores the table 1601 indicating faces and a cluster corresponding to each face, a table 1901 illustrated in FIG. 19 indicating clusters and faces belonging to each cluster, and a table 2001 illustrated in FIG. 20 indicating faces belonging to a cluster and a first clothing type for each face, in addition to the image management information table 201, the people management information table 301, the table 801 indicating third clothing types and the number of images characterized by each third clothing type, the table 901 indicating a correspondence between clothing types and events, and the table 1001 indicating results of event evaluation performed with respect to image groups. Detailed description on the tables 1901 and 2001 is provided in the following.

<Operations>

Figure 17:
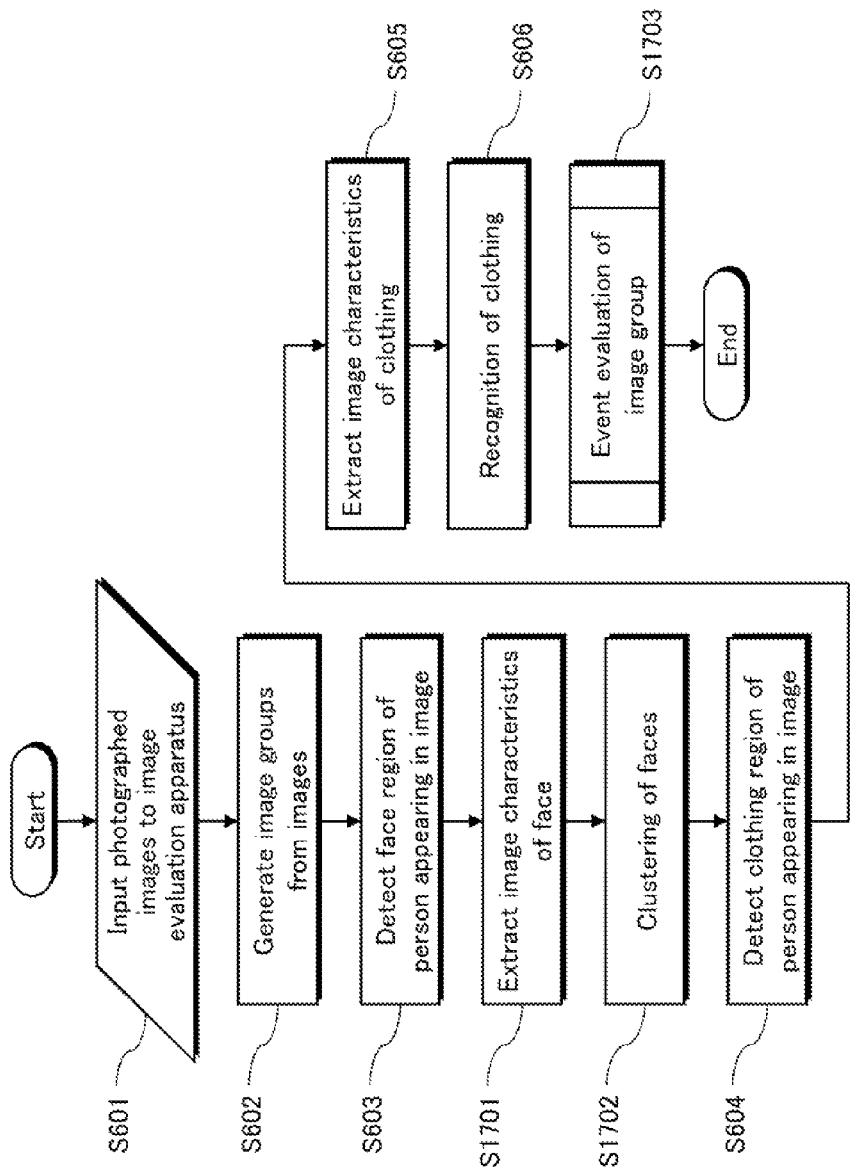
FIG. 17 is a flowchart illustrating processing performed by the image evaluation apparatus 1500 in embodiment 3.

In the following, description is provided on operations of the image evaluation apparatus 1500 pertaining to the present embodiment with reference to the flowchart illustrated in FIG. 17. In the following, description on the processing performed in each of Steps S601 through S606 is omitted for being similar as the corresponding processing in embodiment 1.

The face characteristics extraction unit 1501 extracts face image characteristics from each of the face regions detected by the face detection unit 103 (Step S1701).

The face clustering unit 1502, according to the face image characteristics extracted by the face characteristics extraction unit 1501, classifies faces having similar face image characteristics into the same cluster (Step S1702). The face clustering unit 1502 provides a unique cluster ID to each cluster obtained as a result of the clustering, and registers the cluster IDs to the table 1601 indicating faces and a cluster corresponding to each face.

Figure 18:
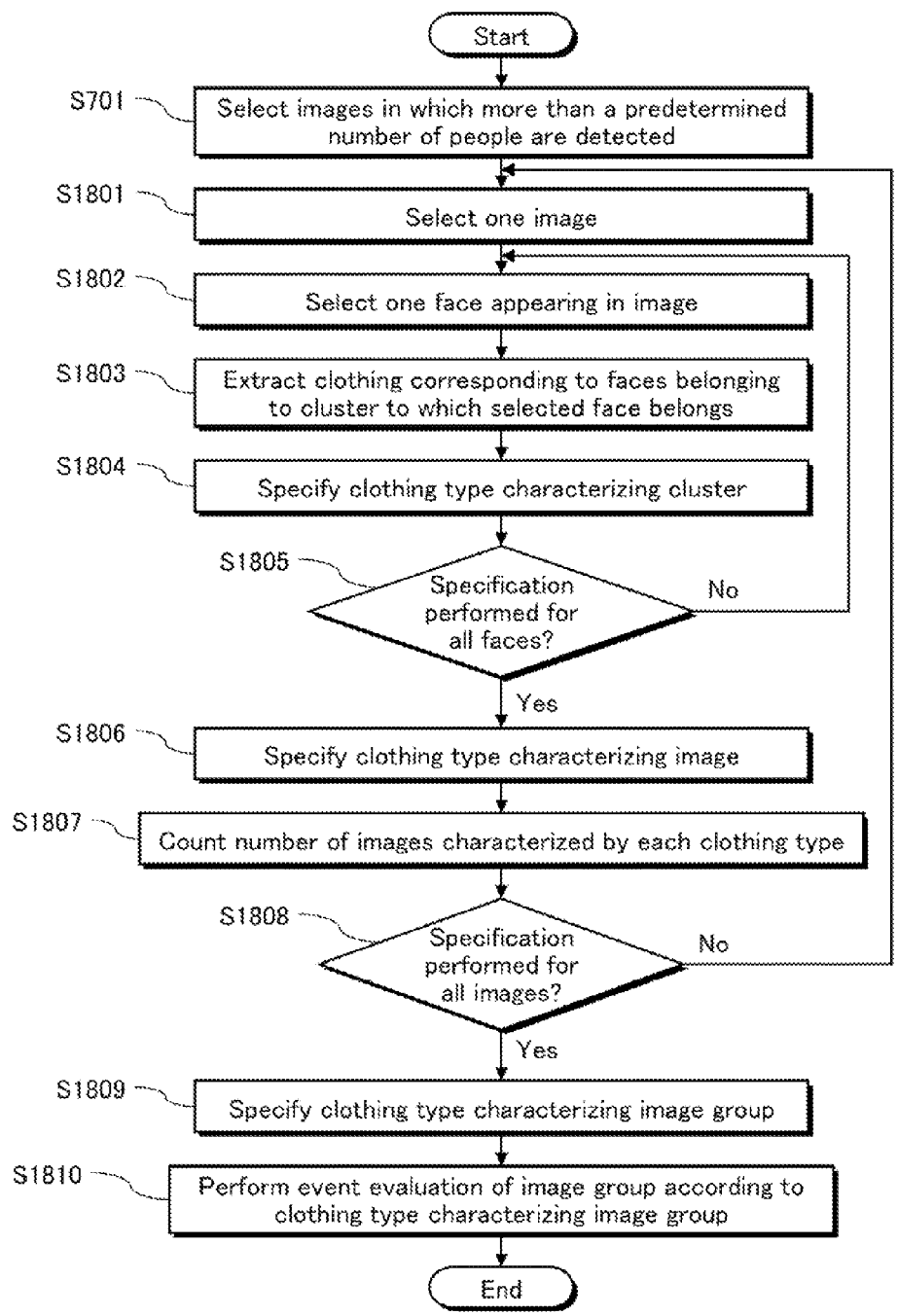
FIG. 18 is a flowchart illustrating processing performed by an image event evaluation unit 1503 in embodiment 3.

The image event evaluation unit 1503 performs event evaluation of image groups based on the contents of the image management information table 201, the contents of the people management information table 301, and the contents of the table 1601 indicating faces and a cluster corresponding to each face (Step S1703). FIG. 18 is a detailed flowchart illustrating operations involved in Step S1703, where the image event evaluation unit 1503 performs event evaluation of one evaluation-target image group.

The image event evaluation unit 1503 selects, from among the images included in the evaluation-target image group, images each including at least a predetermined number of people (Step S701).

The image event evaluation unit 1503 selects one target image from among the images selected in Step S701 (Step S1801).

The image event evaluation unit 1503 selects one face appearing in the image selected in Step S1801 (Step S1802).

The image event evaluation unit 1503 extracts, from each face belonging to a cluster to which the face selected in Step S1802 belongs, a first clothing type specified by the clothing recognition unit 106 (Step S1803).

In the following, description is provided on a specific example of the operations involved in Step S1803, with reference to the table 1601 indicating faces and a cluster corresponding to each face. In this example, a face identified by face ID 1 is selected in Step S1802. According to the table 1601, the cluster into which the person identified by face ID 1 has been classified is indicated by cluster ID 1. The image event evaluation unit 1503 extracts faces corresponding to cluster ID 1 from the table 1601, and creates the table 1901 illustrated in FIG. 19, which indicates clusters and faces belonging to each cluster. According to the table 1901, the people corresponding to cluster ID 1 are identified by face IDs 1, 13, 17, and 31. The image event evaluation unit 1503 extracts first clothing types specified from the faces identified by face IDs 1, 13, 17, and 31 from the people management information table 301 illustrated in FIG. 3. FIG. 20 illustrates an example of results of the extraction of first clothing types as described above.

The image event evaluation unit 1503 specifies a clothing type characterizing the cluster to which the face selected in Step S 1802 belongs (hereinafter referred to as a "fourth clothing type") by specifying a clothing type satisfying a seventh criterion (Step S1804). In other words, the image event evaluation unit 1503, in Step S1804, specifies the clothing that a person corresponding to the face selected in Step S1802 is wearing. Here, a first clothing type satisfying the seventh criterion is a first clothing type having been specified as belonging to a specific clothing type by the clothing recognition unit 106 among the first clothing types extracted through the processing in Step S1803. Here, when two or more first clothing types simultaneously satisfy the seventh criterion, the image event evaluation unit 1503 specifies, as the fourth clothing type for the cluster to which the face selected in Step S1802 belongs, a first clothing type common to a relatively great number of faces belonging to the cluster to which the face selected in Step S1802 belongs.

The image event evaluation unit 1503 determines whether or not the processing in Steps S1803 and S1804 has been performed with respect to all of the faces appearing in the image selected in Step S1801 (Step S1805). Processing proceeds to Step S1806 when determining affirmatively in Step S1805 while processing returns to Step S1802 when determining negatively in Step S1805.

When determining affirmatively in Step S1805, the image event evaluation unit 1503 specifies a clothing type characterizing the image selected in Step S1801 (i.e., a third clothing type for the image selected in Step S1801) by specifying a clothing type in the image satisfying an eighth criterion according to the fourth clothing types for the faces included in the image (Step S1806). Here, a given fourth clothing type, among the fourth clothing types specified in Step S1804, is determined as satisfying the eighth criterion when, for instance, a ratio of the number of clothing of the given fourth clothing type to the total number of clothing appearing in the image selected in Step S1801 exceeds 0.5.

Following this point, the image event evaluation unit 1503 performs processing corresponding to the processing performed by the image event evaluation unit 107 in Steps S703 through S706 in embodiment 1. Therefore, description concerning the processing performed by the image event evaluation unit 1503 following this point is provided in a simplified manner.

The image event evaluation unit 1503 counts the number of images in the image group characterized by the same third clothing type (Step S1807).

The image event evaluation unit 1503 determines whether or not the above-described processing has been performed with respect to all of the images having been selected in Step S701 (Step S1808). Processing proceeds to Step S1809 when determining affirmatively in Step S1808 while processing returns to Step S1801 when determining negatively in Step S1808.

When determining affirmatively in Step S1808, the image event evaluation unit 1503 specifies a clothing type characterizing the image group (i.e., the second clothing type) by specifying a clothing type satisfying a ninth criterion in the image group (Step S1809). Here, a given third clothing type is determined as satisfying the ninth criterion when, for instance, a ratio of the number of images characterized by the given third clothing type to the total number of images of the image group selected in Step S701 exceeds 0.5.

The image event evaluation unit 1503 performs event evaluation with respect to the image group according to the second clothing type (Step S1810).

The image evaluation apparatus 1500 performs event evaluation as described above with respect to all of the image groups having been generated. Finally, the image evaluation apparatus 1500 outputs each of the images acquired by the image acquisition unit 101 to the display device 130 such that the results of the evaluation performed with respect to the images are displayed by the display device 130.

<Conclusion>

The image evaluation apparatus 1500 pertaining to embodiment 3, performs event evaluation of images included in an image group constituted of at least two images according to the clothing types appearing in the images in the image group, the frequency of appearance, in the image group, of images characterized by each different clothing type, and the results of the clustering performed with respect to the faces appearing in the images.

Even when, for instance, a person who is wearing clothing that belongs to the "school gym uniform" clothing type is not recognized as wearing clothing belonging to the "school gym uniform" in a given image as a result of incorrect recognition, the image evaluation apparatus 1500 pertaining to the present embodiment is capable of correctly specifying the clothing that the person is wearing in the given image as belonging to the "school gym uniform" clothing type provided that the same person is recognized as wearing clothing belonging to the "school gym uniform" clothing type in another image in the image group. In short, the image evaluation apparatus 1500 pertaining to the present embodiment is capable of evaluating images with higher accuracy compared to the image evaluation apparatus 100 pertaining to embodiment 1.

<Embodiment 4>

In embodiments 1, through 3, event evaluation of images in an image group is performed according to the number of images in the image group characterized by each different clothing type. In embodiment 4, event evaluation of images is performed by utilizing the clustering of faces appearing in the images as described in embodiment 3, and according to the number of people appearing in the images characterized by each different clothing type. Note that in the following, structures and data similar to those in embodiments 1, and 3, are provided with the same reference signs and description thereon is omitted.

<Structure>

Figure 21:
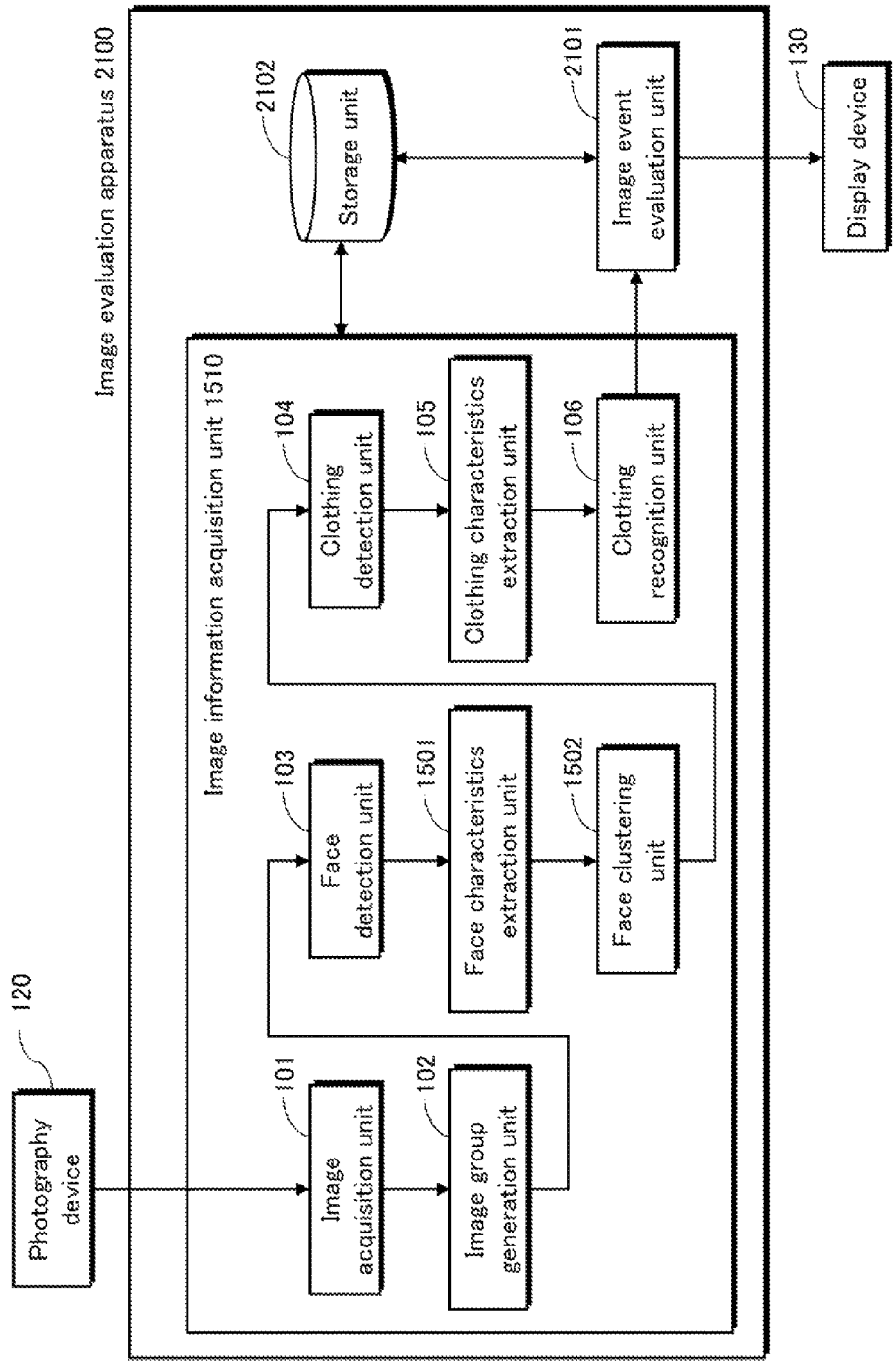
FIG. 21 is a functional block diagram of an image evaluation apparatus 2100 in embodiment 4.

In the following, description is provided on an image evaluation apparatus 2100 pertaining to the present embodiment. FIG. 21 is a functional block diagram of the image evaluation apparatus 2100 in embodiment 4. In the image evaluation apparatus 2100, the image event evaluation unit 1503 and the storage unit 1504 in the image evaluation apparatus 1500 in embodiment 3, are respectively replaced with an image event evaluation unit 2101 and a storage unit 2102.

The image event evaluation unit 2101 performs event evaluation of images in an image group according to the contents of the image management information table 201, the contents of the people management information table 301, and the contents of the table 1601 indicating clusters and faces belonging to each cluster. Details of how event evaluation is performed are described later.

Figure 24:
FIG. 24 illustrates one example of a table indicating third clothing types and the number of clusters characterized by each third clothing type.

The storage unit 2012 stores a table 2401 illustrated in FIG. 24 indicating third clothing types and the number of clusters characterized by each third clothing type, in addition to the image management information table 201, the people management information table 301, the table 901 indicating a correspondence between clothing types and events, the table 1001 indicating results of event evaluation performed with respect to image groups, the table 1601 indicating faces and a cluster corresponding to each face, the table 1901 indicating clusters and faces belonging to each cluster, and the table 2001 indicating faces belonging to a cluster and a first clothing type for each face. Detailed description on the table 2401 is provided in the following.

<Operations>

Figure 22:
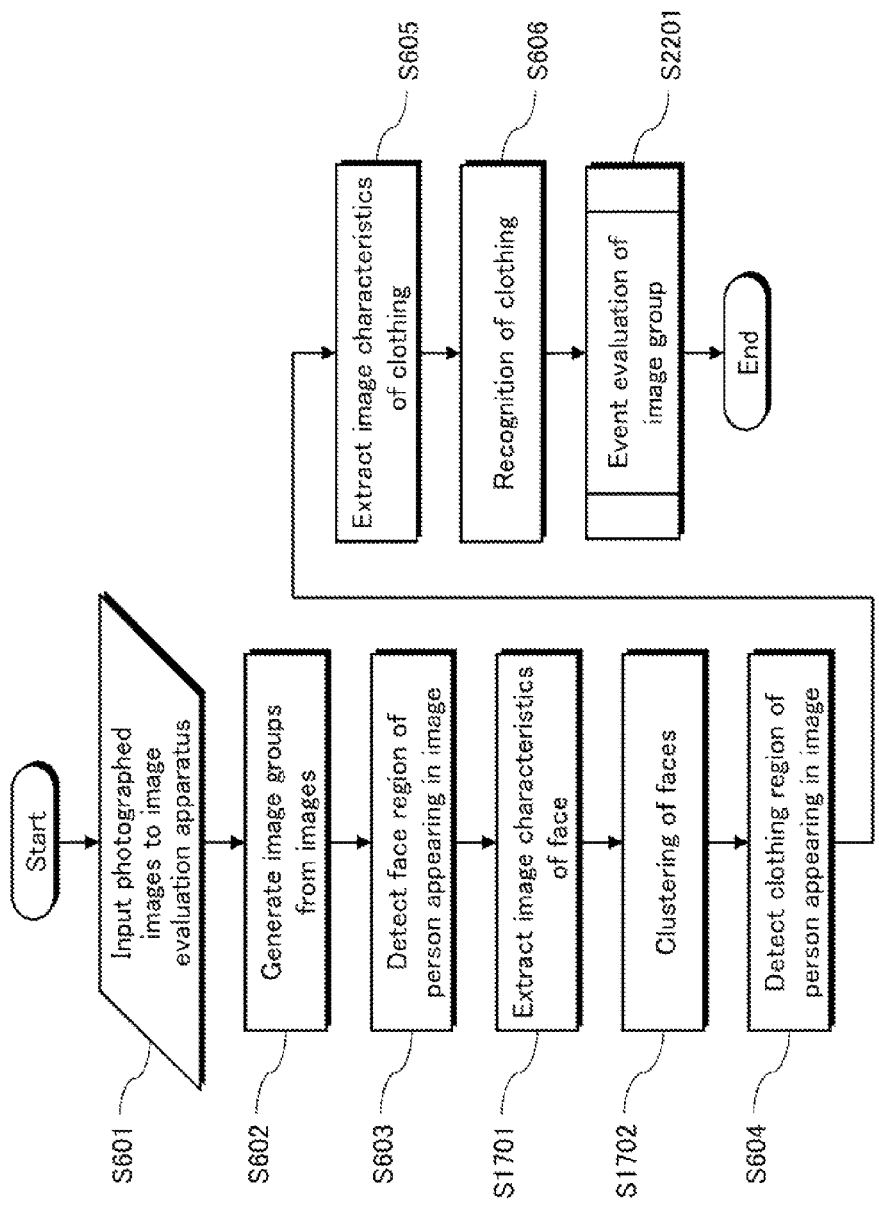
FIG. 22 is a flowchart illustrating processing performed by the image evaluation apparatus 2100 in embodiment 4.

In the following, description is provided on operations of the image evaluation apparatus 2100 pertaining to the present embodiment, with reference to the flowchart illustrated in FIG. 22. In the following, description on the processing performed in each of Steps S601 through S606 and Steps S1701 and S1702 is omitted for being similar as the corresponding processing in embodiment 3.

Figure 23:
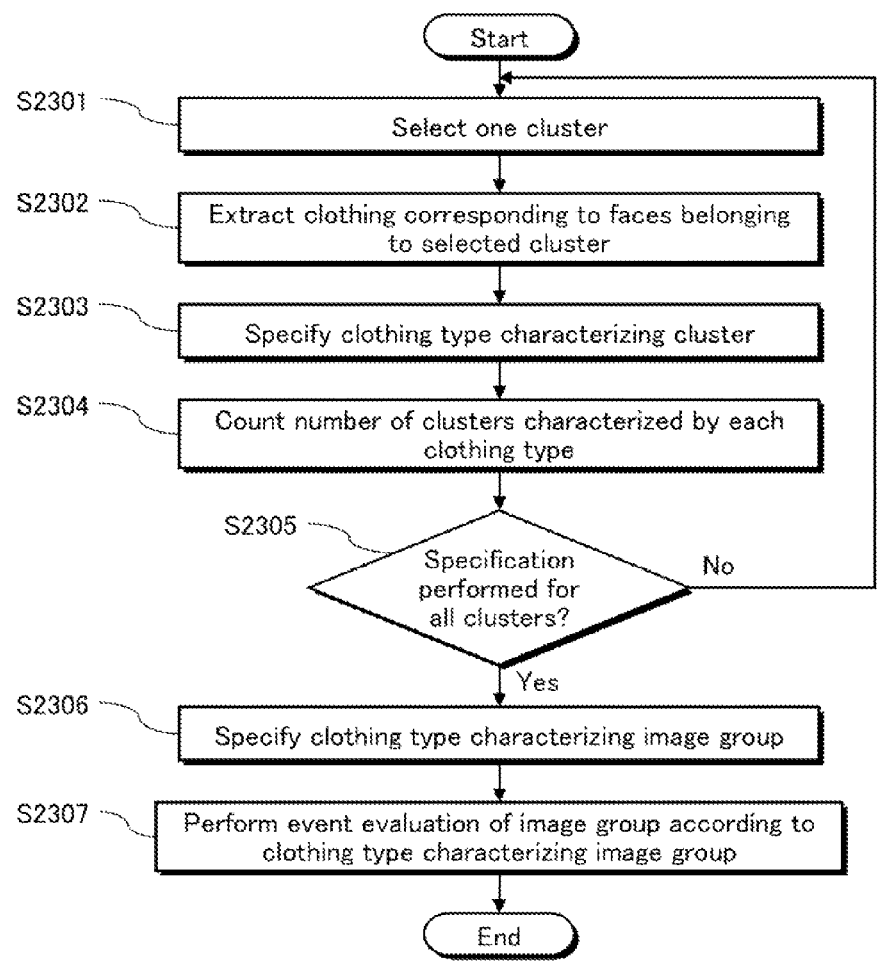
FIG. 23 is a flowchart illustrating processing performed by an image event evaluation unit 2101 in embodiment 4.

The image event evaluation unit 2101 performs event evaluation of image groups based on the contents of the image management information table 201, the contents of the people management information table 301, and the contents of the table 1601 indicating faces and a cluster corresponding to each face (Step S2201). FIG. 23 is a detailed flowchart illustrating operations involved in Step S2201, where the image event evaluation unit 2101 performs event evaluation of one evaluation-target image group.

The image event evaluation unit 2101 selects one cluster among one or more clusters into which faces appearing in images in the evaluation-target image group are classified (Step S2301).

The image event evaluation unit 2101 extracts, from each face belonging to the cluster selected in Step S2301, a first clothing type specified by the clothing recognition unit 106 (Step S2302).

The image event evaluation unit 2101 specifies a clothing type characterizing the cluster selected in Step S2301 (i.e., the third clothing type) by specifying a clothing type satisfying a tenth criterion (Step S2303). Here, a first clothing type satisfying the tenth criterion is a first clothing type having been specified as belonging to a specific clothing type by the clothing recognition unit 106 among the first clothing types extracted through the processing in Step S2302. When two or more first clothing types simultaneously satisfy the tenth criterion, the image event evaluation unit 2101 specifies, as the third clothing type for the cluster selected in Step S2301, a first clothing type common to a relatively great number of faces belonging to the cluster selected in Step S2301, among the first clothing types extracted in Step S2302.

The image event evaluation unit 2101 counts the number of clusters characterized by each different third clothing type (Step S2304). Here, by counting the number of clusters characterized by each different third clothing type in the above described manner, the image event evaluation unit 2101 is actually counting, for each of the different clothing types, the number of people appearing in the image group that are wearing clothing belonging to the clothing type. More specifically, the image event evaluation unit 2101 creates the table 2401 illustrated in FIG. 24 indicating third clothing types and the number of clusters characterized by each third clothing type. Further, when a given third clothing type is specified as characterizing a given cluster in Step S2303, the image event evaluation unit 2101 increments, by one, the value in the field indicating the number of clusters characterized by the given clothing type.

Following this, the image event evaluation unit 2101 determines whether or not the processing in Steps S2302 through S2304 has been performed with respect to each of the clusters in the image group (Step S2305). Processing proceeds to Step S2306 when determining affirmatively in Step S2305 while processing returns to Step S2301 when determining negatively in Step S2305.

When determining affirmatively in Step S2305, the image event evaluation unit 2101 specifies a clothing type characterizing the image group (i.e., the second clothing type) by specifying a clothing type satisfying an eleventh criterion in the image group (Step S2306). Here, a given third clothing type is determined as satisfying the eleventh criterion when, for instance, a ratio of the number of clusters characterized by the given third clothing type to the total number of clusters in the image group exceeds 0.5. That is, when more than half of the people appearing in the image group are wearing clothing belonging to a given clothing type, the image event evaluation unit 2101 specifies the given clothing type as the second clothing type characterizing the image group.

In the following, description is provided on a specific example of the processing in Step S2306, with reference to the table 2401 illustrated in FIG. 24, which indicates third clothing types and the number of clusters characterized by each third clothing type. In this example, the total number of clusters in the image group is 10. Further, the ratio of the number of clusters characterized by the "school gym uniform" clothing type to the total number of clusters in the image group is calculated as $6/10=0.6$. Since the ratio (0.6) of the number of clusters characterized by the "school gym uniform" clothing type (6) to the total number of clusters in the image group (10) exceeds a predetermined ratio (0.5), the "school uniform" clothing type satisfies the eleventh criterion. As such, the image event evaluation unit 2101 specifies the "school gym uniform" clothing type as the second clothing type for the image group.

The image event evaluation unit 2101 performs event evaluation with respect to the image group according to the second clothing type (Step S2307).

The image evaluation apparatus 2100 performs event evaluation as described above with respect to all of the image groups having been generated. Finally, the image evaluation apparatus 2100 outputs each of the images acquired by the image acquisition unit 101 to the display device 130 such that the results of the evaluation performed with respect to the images are displayed by the display device 130.

<Conclusion>

The image evaluation apparatus 2100 pertaining to embodiment 4, performs event evaluation of images included in an image group constituted of at least two images by classifying people appearing in different images corresponding to the same person into the same cluster, and according to the number of clusters corresponding to people characterized by each different clothing type.

The image evaluation apparatus 1500 pertaining to embodiment 3, performs event evaluation with respect to an image group in units of images. As such, when a given person appears in a plurality of images, the risk increases of the evaluation results being influenced to a great extent by the given person as the number of images in which the given person appears increases. In contrast, the image evaluation apparatus 2100 pertaining to the present embodiment classifies people appearing in different images corresponding to the same person into the same cluster, and performs evaluation in units of clusters. As such, the image evaluation apparatus 2100 pertaining to the present embodiment is capable of performing event evaluation of images included in an image group while ensuring that the evaluation results are not strongly influenced by a specific person.

<Supplement 1>

Up to this point, description has been provided on the present invention with reference to specific embodiments thereof. However, the present invention should not be construed as being limited to such embodiments. At least such modifications as presented in the following are to be considered as being within the spirit and scope of the present invention.

(1) In the embodiments, the image group generation unit 102 generates image groups by using a photography date/time acquired from the EXIF information provided to each of the acquired images. However, the present invention is not limited to this, and other methods may be applied for the generation of image groups. For instance, the generation of image groups may be performed such that images taken within a predetermined distance from a given location are classified into the same image group by using photography locations of images acquirable from metadata, such as the EXIF information.

(2) In the embodiments, the clothing detection unit 104 detects a first person whose face region is detected as being lower in a height direction of an image as appearing in front, in the camera direction, of a second person whose face region is detected as being higher in the height direction of the image. However, the present invention is not limited to this, and other methods may be applied for the detection of positional relationships between people appearing in images. For instance, detection may be performed such that a first person whose face region occupies a relatively great area in an image compared to a second person is detected as appearing in front of the second person in the camera direction. In addition, when the photography device 120 is capable of taking and storing images such as stereograms including parallax information, the positional relationships between people appearing in images may be detected by calculating distances between photography-subjects and the camera.

(3) In the embodiments, the specification of clothing types by the clothing recognition unit 106 is performed by providing a classifier that is capable of determining clothing types by being subjected to learning according to the SVM method in advance. However, the present invention is not limited to this, and other methods may be applied as the method for specifying clothing types. For instance, a clothing type may be specified by performing matching between image characteristics having been extracted from a given clothing region and image characteristics serving as templates of different clothing types.

In addition, the image evaluation apparatus pertaining to the present invention may be additionally provided with an update information acquisition unit. An image evaluation apparatus provided with the update information acquisition unit may acquire information for updating the classifier, the templates, etc., via a network and may perform updating of the classifier, the templates, etc., by using such information. The provision of such a structure realizes updating clothing types that the image evaluation apparatus is capable of specifying as necessary. Further, the update information acquisition unit may further be configured such that, when updating the classifier, the templates, etc., the update information acquisition unit also acquires information for updating the table 901 indicating the correspondence between clothing types and events in accordance with the changes made to the classifier, the templates, etc. By making such a configuration, the events that the image evaluation apparatus is able to associate with images can be changed. That is, when provided with such a structure, the image evaluation apparatus is capable of performing event evaluation such that an image group is determined as being related to an event corresponding to a clothing type that has been newly added to the clothing types that the image evaluation apparatus is able to specify.

(4) In the embodiments, the similarity degree calculation unit 1101 calculates a cosine similarity between two vectors each representing image characteristics of clothing worn by a corresponding person as the similarity degree between a combination of clothing appearing in an image. However, the present invention is not limited to this, and other methods may be applied in the calculation of a similarity degree between a combination of clothing appearing in an image. For instance, the similarity degree calculation unit 1101 may calculate a Pearson product-moment correlation coefficient between image characteristics of clothing included in a combination of clothing as the similarity degree between the combination of clothing, or may calculate an reciprocal of a sum of one and a Euclidean distance between two vectors each representing image characteristics of clothing included in the combination of clothing as the similarity degree between the combination of clothing.

(5) In Step S701 in embodiments 1, and 3, images in which only one person appears are excluded from consideration. However, the present invention is not limited to this, and images in which only one person appears may also be selected as the target image in S701.

(6) With regards to the specification of a clothing type characterizing a given image by using similarity degrees calculated by the similarity degree calculation unit 1101, in embodiment 2, the specification of a clothing type characterizing a given image is performed according to (i) the number of combinations of two people wearing clothing indicating similarity or (ii) an average value of similarity degrees for combinations of two people wearing clothing indicating similarity. However, the present invention is not limited to this, and other methods may be applied for specifying a clothing type characterizing a given image by using similarity degrees.

For instance, when there exists a combination of clothing having a higher similarity degree than a predetermined threshold value and when, in the combination, clothing worn by a first person has been specified as belonging to a specific clothing type by the clothing recognition unit 106 while the clothing worn by a second person has been specified as not belonging to a specific clothing type, the clothing worn by the second person can be treated as belonging to the same clothing type as the clothing worn by the first person. In such a manner, compensation of the recognition results of the clothing recognition unit 106 may be performed. When compensation of the recognition results is performed as described above, the image evaluation apparatus pertaining to the present invention may specify a given clothing type whose number of appearance in a given image satisfies a predetermined criterion as the clothing type characterizing the given image by using the compensated recognition results.

(7) In embodiments 1, through 3, the specification of a clothing type characterizing an image group is performed in accordance with the number of images in the image group characterized by the same clothing type. However, the present invention is not limited to this, and other methods may be applied for specifying a clothing type characterizing an image group according to the clothing types characterizing images in the image groups. For instance, a weight may be provided to each of image in an image group according to the number of people appearing in each image, and evaluation of the images in the image group may be performed by summing the weighted values for each of the images characterized by a given clothing type. According to such a method, the images in which a relatively large number of people appear are provided with high evaluations, and therefore, specification can be made of a clothing type that is most dominant among clothing types worn by a large number of people appearing in the images.

(8) In embodiment 3, a clothing type appearing frequently in a given image is specified as the clothing type characterizing the given image. However, in a modification of the present invention, the specification of a clothing type characterizing a given image may be performed by calculating a degree of importance (hereinafter referred to as an "importance degree") of each of the people appearing in the given image and while taking into consideration the importance degrees so calculated. For instance, the calculation of importance degrees for people appearing in images may be performed such that, when a given person appears in a large number of the images, the given person is provided with a high importance degree. In such a case, the calculation of importance degrees is performed in accordance with the number of faces classified into each cluster. Alternatively, the calculation of importance degrees of people may be performed such that, when a given person appears in the center of an image or appears occupying a great area in an image, the given person is provided with a high importance degree. In such a case, the calculation of importance degrees is performed in accordance with the positions of people in images or the sizes at which people are to be displayed.

In the following, description is provided on a modification of the present invention taking as an example the case where the specification of a clothing type characterizing a given image is performed according to importance degrees of people appearing in the given image and where the importance degrees of people are determined in accordance with the number of faces classified into each cluster.

The face clustering unit 1502, after having performed clustering in Step S1702, manages the number of faces classified into each of the clusters obtained as a result of the clustering and the fourth clothing type for each of the clusters (i.e., the clothing type characterizing each of the clusters). Note that, although the fourth clothing types are specified by the image event evaluation unit 1503 in embodiment 3, the specification of the fourth clothing types may be alternatively performed by the face clustering unit 1502. In this example, the result of the clustering indicates that cluster 1 includes six faces and is characterized by the "school gym uniform" clothing type, cluster 2 includes two faces and is characterized by an "unspecified" clothing type, and cluster 3 includes two faces and is characterized by the "unspecified" clothing type. Here, when a cluster is characterized by the "unspecified" clothing type, the clothing type characterizing the cluster is a clothing type specified as not belonging to any specific clothing type.

The image event evaluation unit 1503, when three people classified into cluster 1, cluster 2, and cluster 3 appear in the image selected in Step S1801, specifies a clothing type characterizing the image in Step S1806 according to the method described in the following.

First, the image event evaluation unit 1503 calculates an importance degree (referred to hereinafter as a "cluster importance degree") for each person (cluster) appearing in the image. A cluster importance degree for a given cluster is calculated, for instance, according to the number of faces belonging to the cluster. As such, in this example, the cluster importance degree for cluster 1 is six, the cluster importance degree for cluster 2 is two, and the cluster importance degree for cluster 3 is two.

Subsequently, the image event evaluation unit 1503 calculates an image clothing importance degree for clothing worn by each person appearing in the image. The image clothing importance degree is, for instance, a value calculated by normalizing an accumulated value of the cluster importance degrees of the clusters characterized by a given clothing type.

In this example, since cluster 1 is characterized by the "school gym uniform" clothing type and clusters 2 and 3 are characterized by the "unspecified" clothing type, the image clothing importance degree for the "school gym uniform" clothing type is calculated as $6/(6+2+2)=0.6$, and the image clothing importance degree for the "unspecified" clothing type is calculated as $(2+2)/(6+2+2)=0.4$.

Finally, the image event evaluation unit 1503 specifies a clothing type satisfying a predetermined criterion (for instance, a clothing type whose image clothing importance degree exceeds 0.5) as the clothing type characterizing the image. In this example, since the image clothing importance degree of the "school gym uniform" clothing type is 0.6, and therefore exceeds 0.5, the "school gym uniform" clothing type is specified as the clothing type characterizing the given image.

In addition, in another modification, a clothing type characterizing a given image may be specified by using only people provided with high importance degrees (i.e., important people). Here, a person corresponding to a cluster having a cluster importance degree of four or higher is determined as an important person.

In this example, similar as in the above-described example, cluster 1 includes six faces and is characterized by the clothing type "school gym uniform", cluster 2 includes two faces and is characterized by the "unspecified" clothing type, and cluster 3 includes two faces and is characterized by the "unspecified" clothing type. As such, only the person corresponding to cluster 1 is determined as an important person in the given image. In this example, a clothing type is specified as characterizing the given image when the clothing type satisfies a predetermined criterion. A given clothing type is specified as satisfying the predetermined criterion when a ratio of the number of important people in the given image wearing clothing belonging to the given clothing type to the total number of important people appearing in the image exceeds 0.5. In this example, the ratio of important people wearing clothing belonging to the "school gym uniform" clothing type to the total number of important people appearing in the given image is calculated as $1/1=1$. Hence, the "school gym uniform" clothing types satisfies the predetermined criterion, and therefore, the "school gym uniform" clothing type is specified as the clothing type characterizing the given image.

The modifications described above are also applicable in the specification of a clothing type characterizing an image group in embodiment 4. That is, the specification of a clothing type characterizing an image group in embodiment 4, may be performed while providing weights to clusters according to cluster importance degrees or while using only important people appearing in the image group.

When such modifications as described above are applied, people who are assumed as being important for the photographer of the evaluation-target images are provided with high importance degrees. As such, event evaluation of images can be performed in accordance with the intentions of the photographer of the evaluation-target images.

Note that importance degrees of people appearing in images may be calculated according to information pertaining to an individual who is to be provided with a high importance degree, which is acquirable from external sources, such as a Social Networking Service (SNS). For instance, when face image data for a given person is acquired from an external source as information pertaining to the given person, who is to be provided with a high importance degree, the given person may actually be provided with a high importance degree by extracting face image characteristics from the face image data, and by performing matching between the face image characteristics so obtained and the face image characteristics of people classified into clusters.

(9) In each of embodiments 1, through 4, an image evaluation apparatus pertaining to each embodiment acquires a group of images from the photography device 120 implemented as a digital camera or the like. However, the present invention is not limited to this, and the source from which images are acquired may be any source provided that the source that has the function of accumulating images. For instance, the image evaluation apparatus pertaining to the present invention may be configured to acquire a group of images recorded onto a recording medium such as a hard disk.

(10) In each of embodiments 1, through 4, the image acquisition unit 101 acquires a group of images accumulated by the photography device 120 in a collective manner. However the present invention is not limited to this. For instance, the image acquisition unit 101 may acquire a specific group of images, among the images accumulated in the photography device 120, from the photography device 120 by making a specification of certain conditions, such as a production date/time, and by acquiring a group of images satisfying such conditions.

(11) In each of embodiments 1, through 4, an image evaluation apparatus pertaining to each embodiment performs event evaluation with respect to each of the image groups having been generated, and outputs each of the images acquired from the image acquisition unit 101 to the display device 130 such that the results of the evaluation performed with respect to the images are displayed by the display device 130. However, the present invention is not limited to this, and the results of the evaluation performed by the image evaluation apparatus pertaining to the present invention may be utilized in other ways. For instance, in a table (a database) indicating events determined as corresponding to evaluation-target images and storage locations (addresses) of image files corresponding to the evaluation-target images, the results of the evaluation may be used as indexes in a file system.

(12) In each of embodiments 1, through 4, an image evaluation apparatus corresponding to each embodiment associates, in one-to-one correspondence, an image group with an event determined as being related to the image group as a result of event evaluation. However, the present invention is not limited to this, and an image group may be put into association with a plurality of candidate events. For instance, in the table 901 indicating the correspondence between clothing types and events, a plurality of candidate events may be associated with each clothing type. Further, based on such a table, an image group specified as being characterized by a given second clothing type may be associated with multiple candidate events that correspond to the given second clothing type.

In addition, a plurality of second clothing types may be specified as characterizing a given image group according to the number of images in the image group characterized by each third clothing type, and the given image group may be associated with a plurality of events associated with the plurality of second clothing types. In such a case, the results of event evaluation performed with respect to the image group may be displayed in the form of a ranking in which the events are ranked in accordance with the number of images in the image group characterized by each third clothing type.

Further, when multiple second clothing types are to be specified as characterizing a given image group, event evaluation of the image group may be performed in accordance with a table separately prepared in which a combination of second clothing types such as a "suit" clothing type and a "dress" clothing type and an event such as a "party" are put into association. In such a case, event evaluation of the given image group is performed according to the combination of second clothing types specified for the given image group.

(13) Specific ones of the above-described embodiments and modifications may be used in combined.

(14) A control program composed of program code in machine language or high-level language for causing a processor of an image evaluation apparatus and various circuits connected to the processor to execute the processing described in each of the embodiments 1, through 4, may be distributed by recording the control program onto recording media, or by transmitting the control program via various communication paths. Such recording media which may be used in the distribution of the control program include IC cards, hard disks, optical discs, flexible disks, ROMs, flash memories, and the like. The distributed control program is to be stored to a memory or the like which may be read by a processor, so that the processor may execute the control program. Thereby, each of the functions described in the embodiments is to be realized. Note that the processor may execute the control program either directly, after compiling the control program, or with use of an interpreter.

(15) Each of the functional structures pertaining to embodiments 1, through 4, may be implemented as an LSI (Large Scale Integration), which is a type of integrated circuit. Each of such structures may be separately integrated into a single chip, or the structures may be integrated into a single chip so as to include a part or all of the structures. Although description has been made on the basis of an LSI in the above, the name of the integrated circuit may differ according to the degree of integration of circuits. Other integrated circuits include an IC (integrated circuit), a system LSI, a super LSI, and an ultra LSI. Further, the method applied for forming integrated circuits is not limited to the LSI, and integrated circuits may be formed by using a dedicated circuit or a general purpose processor. In addition, the present invention may be realized by using an FPGA (Field Programmable Gate Array) being an LSI which can be programmed after manufacturing, or a reconfigurable processor being a LSI, reconfiguration of which could be made to the connection of internal circuit cells and settings. In addition, the computation performed by such functional blocks may also be performed by using, for instance, a Digital Signal Processor (DSP) or a Central Processing Unit (CPU). Further, such processing steps as described above may be executed by being recorded onto recording media as a control program and by such a control program being executed.

<Supplement 2>

In the following, description is provided on various aspects of the present invention and effects that are achievable by such aspects.

One aspect of the present invention is an image evaluation apparatus that evaluates images in an image group, comprising: a first specification unit that specifies, for each person appearing in each of the images, a type of clothing that the person is wearing as a first clothing type; a second specification unit that specifies a type of clothing characterizing the image group as a second clothing type according to a frequency of appearance of each of different first clothing types specified from the images in the image group; and an evaluation unit that evaluates the images in the image group by determining, according to the second clothing type, an event at which the images in the image group have been taken.

(B) One aspect of the present invention is an image evaluation method for evaluating images in an image group, comprising: a first specification step of specifying, for each person appearing in each of the images, a type of clothing that the person is wearing as a first clothing type; a second specification step of specifying a type of clothing characterizing the image group as a second clothing type according to a frequency of appearance of each of different first clothing types specified from the images in the image group; and an evaluation step of evaluating the images in the image group by determining, according to the second clothing type, an event at which the images in the image group have been taken.

(C) One aspect of the present invention is a program for causing a computer to execute image evaluation processing of evaluating images in an image group, the image evaluation processing comprising: a first specification step of specifying, for each person appearing in each of the images, a type of clothing that the person is wearing as a first clothing type; a second specification step of specifying a type of clothing characterizing the image group as a second clothing type according to a frequency of appearance of each of different first clothing types specified from the images in the image group; and an evaluation step of evaluating the images in the image group by determining, according to the second clothing type, an event at which the images in the image group have been taken.

(D) One aspect of the present invention is an integrated circuit that evaluates images in an image group, comprising: a first specification unit that specifies, for each person appearing in each of the images, a type of clothing that the person is wearing as a first clothing type; a second specification unit that specifies a type of clothing characterizing the image group as a second clothing type according to a frequency of appearance of each of different first clothing types specified from the images in the image group; and an evaluation unit that evaluates the images in the image group by determining, according to the second clothing type, an event at which the images in the image group have been taken.

According to the structures in (A) through (D) above, even when recognition of the clothing that a person appearing in a given image is wearing is performed incorrectly, evaluation of the given image is performed correctly due to reference being made to the frequency at which different types of clothing appear in a plurality of images including the given image.

(E) The image evaluation apparatus may further comprise a third specification unit that specifies, for each image in the image group, a type of clothing characterizing the image as a third clothing type according to one or more first clothing types corresponding to one or more people appearing in the image, wherein the second specification unit may specify the second clothing type for the image group according to the number of images in the image group characterized by each of different third clothing types.

According to the structure in (E) above, a clothing type characterizing a plurality of images is specified according to the number of images, among the plurality of images, characterized by each different clothing type. As such, a clothing type appearing in a larger number of images, among the plurality of images, is specified.

(F) In the image evaluation apparatus, the third specification unit may specify, as a third clothing type for each image in the image group in which a plurality of people appear, one first clothing type, among a plurality of first clothing types corresponding to the plurality of people appearing in the image, that corresponds to at least a predetermined proportion of the plurality of people appearing in the image or corresponds to at least a predetermined number of people among the plurality of people appearing in the image.

(G) The image evaluation apparatus may further comprise a calculation unit that extracts, for each person appearing in each of the images, image characteristics of clothing that the person is wearing, and calculates, for each possible combination of two people appearing in each image in the image group in which a plurality of people appear, a similarity degree indicating similarity between clothing that the two people are wearing according to image characteristics of the clothing that the two people are wearing, wherein the third specification unit may specify a third clothing type for each image in the image group in which a plurality of people appear according to a plurality of first clothing types corresponding to the plurality of people appearing in the image and a similarity degree for each possible combination of two people among the plurality of people appearing in the image.

(H) In the image evaluation apparatus, the third specification unit, for each image in the image group in which a plurality of people appear, may select, from among one or more possible combinations of two people among the plurality of people appearing in the image, one or more combinations of two people determinable as wearing similar clothing according to a similarity degree for each of the one or more possible combinations, and when the one or more combinations so selected occupy at least a predetermined proportion of the one or more possible combinations or the number of the one or more combinations so selected equals at least a predetermined number, may specify a third clothing type for the image according to a first clothing type for each person included in the one or more combinations so selected.

(I) In the image evaluation apparatus, the third specification unit, for each image in the image group in which a plurality of people appear, may select, from among one or more possible combinations of two people among the plurality of people appearing in the image, one or more combinations of two people determinable as wearing similar clothing according to a similarity degree for each of the one or more possible combinations, and when an average of one or more similarity degrees for the one or more combinations so selected exceeds a value calculated by using a predetermined mathematical formula, may specify a third clothing type for the image according to a first clothing type for each person included in the one or more combinations so selected.

According to the structures in (G) through (I) above, a clothing type characterizing a given image is specified by using, in addition to results of recognition performed of clothing appearing in the given image, similarity degrees between the clothing appearing in the given image. As such, even in a case where, according to conventional technology, clothing actually belonging to the same clothing type is specified as belonging to different clothing types as a result of incorrect recognition, there is a possibility that such clothing is specified as belonging to the same clothing type as a result of the recognition of the clothing being performed by referring to the similarity degree between the clothing.

(J) The image evaluation apparatus may further comprise: a classification unit that extracts, for each person appearing in each of the images, image characteristics of a face of the person, and classifies a plurality of people appearing in the images into a plurality of clusters according to similarity degrees indicating similarity between face image characteristics of the plurality of people such that people appearing in different images but corresponding to the same person are classified into the same cluster; and a fourth specification unit that specifies, for each of the plurality of clusters, a type of clothing characterizing the cluster as a fourth clothing type according to a first clothing type for each person classified into the cluster, wherein the third specification unit may specify a third clothing type for each image in the image group in which a plurality of people appear according to a fourth clothing type for each cluster into which one or more of the plurality of people appearing in the image are classified.

According to the structure in (J) above, clustering is performed according to face image characteristics, and as a result, whereby people appearing in a plurality of images, who actually correspond to the same person, are identified as corresponding to the same person. As such, even when a type of clothing that the person is wearing in a given image is incorrectly recognized, there is a possibility of the result of the recognition performed with respect to the given image being corrected according to the result of the recognition performed of the clothing that the same person is wearing in a different image.

(K) In the image evaluation apparatus, the classification unit may calculate an importance degree of each of the plurality of clusters, and the third specification unit may specify a third clothing type for each image in the image group in which a plurality of people appear according to a fourth clothing type for each cluster into which one or more of the plurality of people appearing in the image are classified and an importance degree for each cluster into which one or more of the plurality of people appearing in the image are classified.

According to the structure in (K) above, the specification of a clothing type characterizing a given image can be performed while taking into consideration the clothing that an important person is wearing in the given image.

(L) The image evaluation apparatus may further comprise: a classification unit that extracts, for each person appearing in each of the images, image characteristics of a face of the person, and classifies a plurality of people appearing in the images into a plurality of clusters according to similarity degrees indicating similarity between face image characteristics of the plurality of people such that people appearing in different images but corresponding to the same person are classified into the same cluster; and a third specification unit that specifies, for each of the plurality of clusters, a type of clothing characterizing the cluster as a third clothing type according to a first clothing type for each person classified into the cluster, wherein the second specification unit may specify the second clothing type for the image group according to the number of clusters, among the plurality of clusters, characterized by each of different third clothing types.

According to the structure in (L) above, a clothing type characterizing a plurality of images is specified according to the number of clusters characterized by each different clothing type. As such, specification is performed of a type of clothing worn by many of the people appearing in the images. Further, according to the structure in (L) above, even when a given person appears in many images, the risk is reduced of the evaluation results being influenced to a great extent by the given person.

(M) In the image evaluation apparatus, the classification unit may calculate an importance degree of each of the plurality of clusters, and the second specification unit may specify the second clothing type according to the number of clusters, among the plurality of clusters, characterized by each of different third clothing types and the importance degree for each of the plurality of clusters.

According to the structure in (M) above, an event related an image group is determined while taking into consideration the clothing worn by important people.

(N) In the image evaluation apparatus, the first specification unit may specify a first clothing type for each person appearing in each of the images by using clothing information usable for specifying clothing types, and the image evaluation apparatus may further comprise an update unit that updates the clothing information.

According to the structure in (N) above, the clothing types that the image evaluation apparatus is able to specify and the events that the image evaluation apparatus is able to determine as being related to image groups is changed as necessary.

(O) The image evaluation apparatus may further comprise a calculation unit that detects, for each person appearing in each of the images, a face region corresponding to a face of the person, and calculates a clothing region corresponding to clothing that the person is wearing, wherein the first specification unit may specify a first clothing type for each person appearing in each of the images according to image characteristics extracted from a clothing region corresponding to the person.

According to the structure in (O) above, a clothing region for a person appearing in a given image is detectable when a face region, in the given image, for the person is detectable.

(P) In the image evaluation apparatus, in a given image among the images, when two clothing regions corresponding to two people appearing in the given image overlap each other, the calculation unit may specify, according to two face regions in the given image corresponding to the two people, one person among the two people that appears in front of the other person and may determine a region of the given image at which the two clothing regions overlap as belonging to a clothing region of the one person so specified.

According to the structure in (P) above, when a region in a given image detected as the clothing a first person is wearing and a region in the same image detected as the clothing a second person is wearing overlap each other, the clothing region for each of the first person and the second person can be determined based on a positional relationship between the two people in the given image.

The image evaluation apparatus pertaining to the present invention is applicable to devices accumulating still images and moving images, photography devices such as digital cameras, mobile phones provided with camera functions, and movie cameras, Personal Computers (PCs), and the like.

<Reference Signs List>

100, 1100, 1500, 2100 image evaluation apparatus
101 image acquisition unit
102 image group generation unit
103 face detection unit
104 clothing detection unit
105 clothing characteristics extraction unit
106 clothing recognition unit 107, 1102, 1503, 2101 image event evaluation unit
108, 1103, 1504, 2102 storage unit
110, 1110, 1510 image information acquisition unit
120 photography device
130 display device
201 image management information table
301 people management information table
401, 402, 403 image
402a, 403a, 403b, detected face region
402a', 403a', 403b' detected clothing region
801 table indicating third clothing types and the number of images characterized by each third clothing type
901 table indicating correspondence between clothing types and events
1001 table indicating results of event evaluation performed with respect to image groups
1101 similarity degree calculation unit
1201 table indicating similarity between the clothing people in an image are wearing
1501 face characteristics extraction unit
1502 face clustering unit
1601 table indicating faces and a cluster corresponding to each face
1901 table indicating clusters and faces belonging to each cluster
2001 table indicating faces belonging to a cluster and a first clothing type for each face
2401 table indicating third clothing types and the number of clusters characterized by each third clothing type

The invention claimed is:

1. An image evaluation apparatus that evaluates images in an image group, comprising:
 a non-transitory memory storing a program; and
 a hardware processor that executes the program and causes the image evaluation apparatus to operate as:
 a first specification unit that specifies, for each person appearing in each of the images, a type of clothing that the person is wearing as a first clothing type;
 a second specification unit that specifies, for each image in the image group, a type of clothing characterizing the image as a second clothing type according to one or more first clothing types corresponding to one or more people appearing in the image;
 a third specification unit that specifies a type of clothing characterizing the image group as a third clothing type according to the number of images in the image group characterized by each of different second clothing types; and
 an evaluation unit that evaluates the images in the image group by determining, according to the third clothing type, an event at which the images in the image group have been taken,
 wherein when an image in the image group includes one or more people corresponding to one first clothing type and one or more people corresponding to another first clothing type differing from the one first clothing type, the second specification unit specifies one of the one first clothing type and the other first clothing type that corresponds to a greater number of people in the image as the second clothing type for the image, and
 when the image group includes one or more images corresponding to one second clothing type and one or more images corresponding to another second clothing type differing from the one second clothing type, the third specification unit specifies one of the one second clothing type and the other second clothing type that corresponds to a greater number of images in the image group as the third clothing type for the image group.

2. The image evaluation apparatus of claim 1, wherein
 the second specification unit specifies, as a second clothing type for each image in the image group in which a plurality of people appear, one first clothing type, among a plurality of first clothing types corresponding to the plurality of people appearing in the image, that corresponds to at least a predetermined proportion of the plurality of people appearing in the image or corresponds to at least a predetermined number of people among the plurality of people appearing in the image.

3. The image evaluation apparatus of claim 1 further comprising
 a calculation unit that extracts, for each person appearing in each of the images, image characteristics of clothing that the person is wearing, and calculates, for each possible combination of two people appearing in each image in the image group in which a plurality of people appear, a similarity degree indicating similarity between clothing that the two people are wearing according to image characteristics of the clothing that the two people are wearing, wherein
 the second specification unit specifies a second clothing type for each image in the image group in which a plurality of people appear according to a plurality of first clothing types corresponding to the plurality of people appearing in the image and a similarity degree for each possible combination of two people among the plurality of people appearing in the image.

4. The image evaluation apparatus of claim 3, wherein
 the second specification unit, for each image in the image group in which a plurality of people appear,
 selects, from among one or more possible combinations of two people among the plurality of people appearing in the image, one or more combinations of two people determinable as wearing similar clothing according to a similarity degree for each of the one or more possible combinations, and
 when the one or more combinations so selected occupy at least a predetermined proportion of the one or more possible combinations or the number of the one or more combinations so selected equals at least a predetermined number, specifies a second clothing type for the image according to a first clothing type for each person included in the one or more combinations so selected.

5. The image evaluation apparatus of claim 3, wherein
 the second specification unit, for each image in the image group in which a plurality of people appear,
 selects, from among one or more possible combinations of two people among the plurality of people appearing in the image, one or more combinations of two people determinable as wearing similar clothing according to a similarity degree for each of the one or more possible combinations, and
 when an average of similarity degrees for the one or more combinations so selected exceeds a value calculated by using a predetermined mathematical formula, specifies a second clothing type for the image according to a first clothing type for each person included in the one or more combinations so selected.

6. The image evaluation apparatus of claim 1 further comprising:
 a classification unit that extracts, for each person appearing in each of the images, image characteristics of a face of the person, and classifies a plurality of people appearing in the images into a plurality of clusters according to similarity degrees indicating similarity between face image characteristics of the plurality of people such that people appearing in different images but corresponding to the same person are classified into the same cluster; and a fourth specification unit that specifies, for each of the plurality of clusters, a type of clothing characterizing the cluster as a fourth clothing type according to a first clothing type for each person classified into the cluster, wherein the second specification unit specifies a second clothing type for each image in the image group in which a plurality of people appear according to a fourth clothing type for each cluster into which one or more of the plurality of people appearing in the image are classified.

7. The image evaluation apparatus of claim 6, wherein
the classification unit calculates an importance degree of each of the plurality of clusters, and
the second specification unit specifies a second clothing type for each image in the image group in which a plurality of people appear according to a fourth clothing type for each cluster into which one or more of the plurality of people appearing in the image are classified and an importance degree for each cluster into which one or more of the plurality of people appearing in the image are classified.

8. An image evaluation apparatus for evaluating images included in an image group, comprising:
a non-transitory memory storing a program; and
a hardware processor that executes the program and causes the image evaluation apparatus to operate as:
a first specification unit that specifies, for each person appearing in each of the images, a type of clothing that the person is wearing as a first clothing type;
a classification unit that extracts, for each person appearing in each of the images, image characteristics of a face of the person, and classifies a plurality of people appearing in the images into a plurality of clusters according to similarity degrees indicating similarity between face image characteristics of the plurality of people such that people appearing in different images but corresponding to the same person are classified into the same cluster;
a second specification unit that specifies, for each of the plurality of clusters, a type of clothing characterizing the cluster as a second clothing type according to a first clothing type for each person classified into the cluster;
a third specification unit that specifies a type of clothing characterizing the image group as a third clothing type according to the number of clusters, among the plurality of clusters, characterized by each of different second clothing types; and
an evaluation unit that evaluates the images in the image group by determining, according to the third clothing type, an event at which the images in the image group have been taken,
wherein when an image in the image group includes one or more people corresponding to one first clothing type and one or more people corresponding to another first clothing type differing from the one first clothing type, the second specification unit specifies one of the one first clothing type and the other first clothing type that corresponds to a greater number of people in the image as the second clothing type for the image, and
when the image group includes one or more images corresponding to one second clothing type and one or more images corresponding to another second clothing type differing from the one second clothing type, the third specification unit specifies one of the one second clothing type and the other second clothing type that corresponds to a greater number of images in the image group as the third clothing type for the image group.

9. The image evaluation apparatus of claim 8, wherein
the classification unit calculates an importance degree of each of the plurality of clusters, and
the third specification unit specifies the third clothing type according to the number of clusters, among the plurality of clusters, characterized by each of different second clothing types and the importance degree for each of the plurality of clusters.

10. The image evaluation apparatus of claim 1, wherein
the first specification unit specifies a first clothing type for each person appearing in each of the images by using clothing information usable for specifying clothing types, and
the image evaluation apparatus further comprises an update unit that updates the clothing information.

11. The image evaluation apparatus of claim 1 further comprising
a calculation unit that detects, for each person appearing in each of the images, a face region corresponding to a face of the person, and calculates a clothing region corresponding to clothing that the person is wearing, wherein
the first specification unit specifies a first clothing type for each person appearing in each of the images according to image characteristics extracted from a clothing region corresponding to the person.

12. The image evaluation apparatus of claim 11, wherein
in a given image among the images, when two clothing regions corresponding to two people appearing in the given image overlap each other,
the calculation unit specifies, according to two face regions in the given image corresponding to the two people, one person among the two people that appears in front of the other person and determines a region of the given image at which the two clothing regions overlap as belonging to a clothing region of the one person so specified.

13. An image evaluation method for evaluating images in an image group, comprising:
a first specification step of specifying, for each person appearing in each of the images, a type of clothing that the person is wearing as a first clothing type;
a second specification step of specifying, for each image in the image group, a type of clothing characterizing the image as a second clothing type according to one or more first clothing types corresponding to one or more people appearing in the image;
a third specification step of specifying a type of clothing characterizing the image group as a third clothing type according to the number of images in the image group characterized by each of different second clothing types; and
an evaluation step of evaluating the images in the image group by determining, according to the third clothing type, an event at which the images in the image group have been taken,
wherein when an image in the image group includes one or more people corresponding to one first clothing type and one or more people corresponding to another first clothing type differing from the one first clothing type, the second specification step specifies one of the one first clothing type and the other first clothing type that corresponds to a greater number of people in the image as the second clothing type for the image, and when the image group includes one or more images corresponding to one second clothing type and one or more images corresponding to another second clothing type differing from the one second clothing type, the third specification step specifies one of the one second clothing type and the other second clothing type that corresponds to a greater number of images in the image group as the third clothing type for the image group.

14. A non-transitory computer-readable recording medium storing a program for causing a computer to execute image evaluation processing of evaluating images in an image group, the image evaluation processing comprising:
   a first specification step of specifying, for each person appearing in each of the images, a type of clothing that the person is wearing as a first clothing type;
   a second specification step of specifying, for each image in the image group, a type of clothing characterizing the image as a second clothing type according to one or more first clothing types corresponding to one or more people appearing in the image;
   a third specification step of specifying a type of clothing characterizing the image group as a third clothing type according to the number of images in the image group characterized by each of different second clothing types; and
   an evaluation step of evaluating the images in the image group by determining, according to the third clothing type, an event at which the images in the image group have been taken,
   wherein when an image in the image group includes one or more people corresponding to one first clothing type and one or more people corresponding to another first clothing type differing from the one first clothing type, the second specification step specifies one of the one first clothing type and the other first clothing type that corresponds to a greater number of people in the image as the second clothing type for the image, and
   when the image group includes one or more images corresponding to one second clothing type and one or more images corresponding to another second clothing type differing from the one second clothing type, the third specification step specifies one of the one second clothing type and the other second clothing type that corresponds to a greater number of images in the image group as the third clothing type for the image group.

15. An integrated circuit that evaluates images in an image group, comprising:
   a non-transitory memory storing a program; and
   a hardware processor that executes the program and causes the image evaluation apparatus to operate as:
   a first specification unit that specifies, for each person appearing in each of the images, a type of clothing that the person is wearing as a first clothing type;
   a second specification unit that specifies, for each image in the image group, a type of clothing characterizing the image as a second clothing type according to one or more first clothing types corresponding to one or more people appearing in the image;
   a third specification unit that specifies a type of clothing characterizing the image group as a third clothing type according to the number of images in the image group characterized by each of different second clothing types; and
   an evaluation unit that evaluates the images in the image group by determining, according to the third clothing type, an event at which the images in the image group have been taken,
   wherein when an image in the image group includes one or more people corresponding to one first clothing type and one or more people corresponding to another first clothing type differing from the one first clothing type, the second specification step specifies one of the one first clothing type and the other first clothing type that corresponds to a greater number of people in the image as the second clothing type for the image, and
   when the image group includes one or more images corresponding to one second clothing type and one or more images corresponding to another second clothing type differing from the one second clothing type, the third specification step specifies one of the one second clothing type and the other second clothing type that corresponds to a greater number of images in the image group as the third clothing type for the image group.

* * * * *